United States Patent
Unagami et al.

(10) Patent No.: US 9,641,596 B2
(45) Date of Patent: May 2, 2017

(54) HOME APPLIANCE INFORMATION MANAGEMENT APPARATUS, HOME APPLIANCE INFORMATION SHARING METHOD, AND HOME APPLIANCE INFORMATION SHARING SYSTEM

(71) Applicant: Panasonic Corporation, Osaka (JP)

(72) Inventors: Yuji Unagami, Osaka (JP); Tomoyuki Haga, Nara (JP); Natsume Matsuzaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 335 days.

(21) Appl. No.: 14/113,258

(22) PCT Filed: Dec. 26, 2012

(86) PCT No.: PCT/JP2012/008333
§ 371 (c)(1),
(2) Date: Oct. 22, 2013

(87) PCT Pub. No.: WO2013/111244
PCT Pub. Date: Aug. 1, 2013

(65) Prior Publication Data
US 2014/0250183 A1    Sep. 4, 2014

(30) Foreign Application Priority Data
Jan. 25, 2012    (JP) .................................. 2012-013400

(51) Int. Cl.
*G06F 15/16* (2006.01)
*H04L 29/08* (2006.01)
(Continued)

(52) U.S. Cl.
CPC ............. *H04L 67/10* (2013.01); *G06Q 10/06* (2013.01); *G06Q 50/06* (2013.01); *H04L 12/281* (2013.01);
(Continued)

(58) Field of Classification Search
CPC ....................................................... H04L 67/10
See application file for complete search history.

(56) References Cited

U.S. PATENT DOCUMENTS

| | | |
|---|---|---|
| 7,571,248 B2 | 8/2009 | Kutsumi et al. |
| 7,899,902 B2 | 3/2011 | Hyotani et al. |

(Continued)

FOREIGN PATENT DOCUMENTS

| | | |
|---|---|---|
| CN | 1735903 | 2/2006 |
| CN | 102318237 | 1/2012 |

(Continued)

OTHER PUBLICATIONS

International Search Report issued Feb. 26, 2013 in International (PCT) Application No. PCT/JP2012/008333.
(Continued)

*Primary Examiner* — Vivek Srivastava
*Assistant Examiner* — Nicholas Celani
(74) *Attorney, Agent, or Firm* — Wenderoth, Lind & Ponack, L.L.P.

(57) ABSTRACT

A management apparatus which collects, from a home appliance, home appliance information which is information related to the home appliance and provides a user with to-be-provided information which is information obtained from the collected home appliance information, includes: a managing unit which manages the home appliance information; and a home appliance information holding unit which holds, in association with each other, (i) the home appliance information and (ii) share information which is for sharing
(Continued)

the home appliance information and is associated with the user. The managing unit refers to data held by the home appliance information holding unit when a request for to-be-provided information is issued by the user, obtains the home appliance information held in association with share information identical to the share information associated with the user, and provides the user with to-be-provided information obtained from the obtained information.

18 Claims, 37 Drawing Sheets

(51) Int. Cl.
  *H04M 3/51* (2006.01)
  *H04L 12/28* (2006.01)
  *G06Q 10/06* (2012.01)
  *G06Q 50/06* (2012.01)
(52) U.S. Cl.
  CPC ........ *H04L 12/283* (2013.01); *H04L 12/2807* (2013.01); *H04L 12/2809* (2013.01); *H04M 3/5166* (2013.01)

(56) References Cited

U.S. PATENT DOCUMENTS

| | | | |
|---|---|---|---|
| 2005/0117719 A1 | 6/2005 | Hyotani et al. | |
| 2006/0053219 A1 | 3/2006 | Kutsumi et al. | |
| 2006/0075092 A1* | 4/2006 | Kidokoro | 709/224 |
| 2006/0288101 A1* | 12/2006 | Mastrodonato et al. | 709/224 |
| 2009/0287498 A2* | 11/2009 | Mr. Choi | 705/1 |
| 2010/0132049 A1* | 5/2010 | Vernal | G06F 21/6245 726/27 |
| 2011/0222523 A1 | 9/2011 | Fu et al. | |

FOREIGN PATENT DOCUMENTS

| | | |
|---|---|---|
| JP | 2005-141728 | 6/2005 |
| JP | 2006-107456 | 4/2006 |
| JP | 3136380 | 10/2007 |
| JP | 2011-004424 | 1/2011 |

OTHER PUBLICATIONS

Nikkei Electronics 2011, Mar. 21, pp. 56-63 with partial English translation.

Chinese Office Action issued Sep. 2, 2015 in corresponding Chinese Patent Application No. 201280019748.5 (with partial English translation).

\* cited by examiner

FIG. 3

| Device ID | User ID | Share code | Home appliance information list 1051 | | | | |
|---|---|---|---|---|---|---|---|
| ID030 | User A | Code AA | Home appliance history information | Home appliance history information A1 | Home appliance history information A2 | Home appliance history information A3 | |
| | User B | Code AA | | | | | Home appliance history information B1 |
| | User C | Code CC | | | | | Home appliance history information C1 |

FIG. 8

| Device ID | User ID | Share code | Home appliance history information | Home appliance history information A1 | Home appliance history information A2 |
|---|---|---|---|---|---|
| ID030 | User A | Code AA | | | |

Home appliance information list 1051A

FIG. 11

| Device ID | User ID | Share code | Home appliance information list 1051B |
|---|---|---|---|
| ID030 | User A | Code AA | Home appliance history information A1 |
| | | | Home appliance history information A2 |
| | | | Home appliance history information A3 |
| | User B | Code AA | Home appliance history information B1 |

FIG. 12

| Device ID | User ID | Community | Home appliance information list 1052 |
|---|---|---|---|
| ID030 | User A | Community 1 | Home appliance history information |
| | | | Home appliance history information A1 |
| | | | Home appliance history information A2 |
| | | | Home appliance history information A3 |
| | User B | Community 1 | Home appliance history information B1 |
| | User C | Community 2 | Home appliance history information C1 |

FIG. 14

| Device ID | User ID | Community | Home appliance information | Home appliance history information |
|---|---|---|---|---|
| ID030 | User A | Community 1 | | |
| | User B | Community 1 | | Home appliance history information B1 |

Home appliance information list 1052A

FIG. 16

| Device ID | User ID | Community | Home appliance information list 1052B |
|---|---|---|---|
| | | | Home appliance history information |
| ID030 | User A | Community 1 | Home appliance history information A1 |
| | | | Home appliance history information A2 |
| | | | Home appliance history information A3 |
| | User B | Community 1 | Home appliance history information B1 |

FIG. 17

| Device ID | User ID | Master | Home appliance history information |
|---|---|---|---|
| ID030 | User A | ○ | |

Home appliance information list 1053

FIG. 21

| Device ID | User ID | Master | Home appliance information list 1053A |
|---|---|---|---|
| ID030 | User A | ○ | Home appliance history information A1 |
| | | | Home appliance history information A2 |
| | | | Home appliance history information A3 |
| | User B | | Home appliance history information B1 |

FIG. 27

| GW Device ID | Home electrical appliance ID | Share password | User ID | Home appliance information list 1055 |
|---|---|---|---|---|
| GW050 | ID031 | Code AA | User A | Home appliance history information |
| | | | | Home appliance history information A1 |
| | | | | Home appliance history information A2 |
| | | | | Home appliance history information A3 |
| | | | User B | Home appliance history information B1 |
| | | | | Home appliance history information B2 |

FIG. 37

| GW device ID | Home electrical appliance ID | Share password | User ID | Home appliance information list 1056 |
|---|---|---|---|---|
| GW050 | ID031 | Code AA | User A | Home appliance history information A1 |
| | | | | Home appliance history information A2 |
| | | ○ | | Home appliance history information A3 |
| | | | User B | Home appliance history information B1 |
| | | | | Home appliance history information B2 |

HOME APPLIANCE INFORMATION MANAGEMENT APPARATUS, HOME APPLIANCE INFORMATION SHARING METHOD, AND HOME APPLIANCE INFORMATION SHARING SYSTEM

TECHNICAL FIELD

The present invention relates to a home appliance information management apparatus, a home appliance information sharing method, and a home appliance information sharing system, for sharing home appliance information collected from home electrical appliances (hereinafter also simply referred to as "home appliances").

BACKGROUND ART

RFID (radio frequency identification) standards which use the 13.56 MHz frequency bandwidth include ISO 14443 Type A, ISO 14443 Type B, and ISO 15693. In addition, NFC (near field communication) standards are the international standard of the near field communication technology developed so that these RFID standards can be treated collectively.

Since NFC is employed in smartphones which are rapidly spreading in recent years, expansion of various services using NFC is expected. Such NFC installation in smartphones is generalized, increasing the probability that NFC is also employed in devices other than smartphones (healthcare devices, large household devices, for example) (See Non Patent Literature (NPL) 1). Installing an NFC tag into a home appliance enables implementation of services in cooperation with the home appliance. With the services associated with a home appliance, it is possible to read a variety of information items accumulated in a home appliance (information related to the home appliance, for example ((hereinafter simply referred to as "home appliance information"))) by a smartphone in which an NFC function is installed.

Here, there is a proposed technique for sharing the home appliance information among specific members, using an e-mail address (See Patent Literature (PTL) 1, for example).

CITATION LIST

Patent Literature

[PTL 1]
[Patent Literature 1] Japanese Registered Utility Model NO. 3136380

Non Patent Literature

[NPL 1]
[Non Patent Literature 1] NIKKEI ELECTRONICS Mar. 21, 2011 (P56 to P63)

SUMMARY OF INVENTION

Technical Problem

However, since an e-mail address is used in the above-described conventional techniques for sharing home appliance information, there is a possibility that privacy of a user cannot be protected.

The present invention provides a home appliance information management apparatus, a home appliance information sharing method, and a home appliance information sharing system, which allow sharing of home appliance information while privacy of a user is protected.

Solution to Problem

A home appliance information management apparatus according to an aspect of the present invention is a home appliance information management apparatus which collects, from a home electrical appliance, home appliance information which is information related to the home electrical appliance, and provides a user with to-be-provided information which is information obtained from the collected home appliance information, the home appliance information management apparatus including: a managing unit configured to manage the home appliance information; and a home appliance information holding unit configured to hold share information and the home appliance information in association with each other, the share information being for sharing the home appliance information and being associated with the user, wherein the managing unit is configured to, when a request for providing the to-be-provided information is issued by the user: refer to data held by the home appliance information holding unit; obtain home appliance information held in association with share information identical to the share information associated with the user; and provide the user with the to-be-provided information obtained from the obtained home appliance information.

It is to be noted that these generic and specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, and recording media.

Advantageous Effects of Invention

According to the present invention, it is possible to share home appliance information while privacy of a user is protected.

BRIEF DESCRIPTION OF DRAWINGS

FIG. 3 is a diagram which illustrates an example of a home appliance information list according to Embodiment 1.

FIG. 8 is a diagram which illustrates an example of the home appliance information list on which a user A is registered according to Embodiment 1.

FIG. 11 is a diagram which illustrates an example of the home appliance information list on which a user B is registered according to Embodiment 1.

FIG. 12 is a diagram which illustrates an example of a home appliance information list according to Embodiment 2.

FIG. 14 is a diagram which illustrates an example of the home appliance information list on which a user A is registered according to Embodiment 2.

FIG. 16 is a diagram which illustrates an example of the home appliance information list according to Embodiment 2.

FIG. 17 is a diagram which illustrates an example of a home appliance information list according to Embodiment 3.

FIG. 21 is a diagram which illustrates an example of the home appliance information list on which a user B is registered according to Embodiment 3.

FIG. 27 is a diagram which illustrates an example of a home appliance information list according to Embodiment 5.

FIG. 37 is a diagram which illustrates an example of a home appliance information list according to a modification example of Embodiment 5.

DESCRIPTION OF EMBODIMENTS

Figure 1:
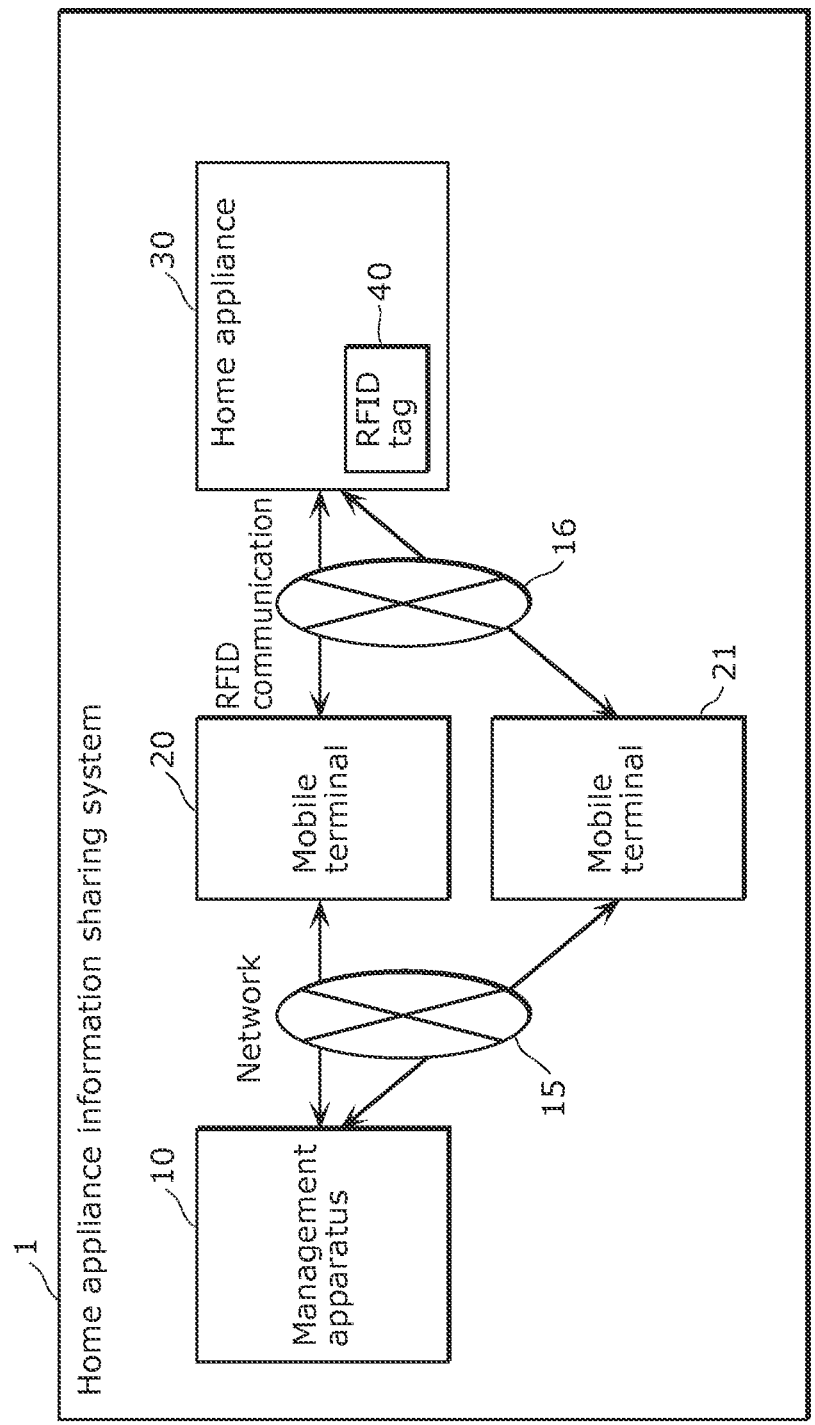
FIG. 1 is a diagram which illustrates an overall configuration of a home appliance information sharing system according to Embodiment 1.

Underlying Knowledge Forming Basis of the Present Disclosure

When home appliance information read from a home appliance is to be read by a smartphone, a service can be considered which transmits, to a cloud server, and accumulates the home appliance information using a communication function of the smartphone, in stead of holding the home appliance information in the smartphone. This makes it possible to provide a variety of services suitable to a user based on the home appliance information accumulated in the server.

Here, in the case where the home appliance information is privacy information such as operation history of a home appliance or information on power consumption, privacy information leaks when the home appliance information accumulated in the server can be viewed by anyone. However, in the case where the home appliance information accumulated in the server can be viewed only by the user who has transmitted the home appliance information to the server, the home appliance information cannot be viewed even by a family member of the user who uses the same home appliance. In addition, the data amount of home appliance information which can be stored within the home appliance depends on the capacity of a memory that is mounted on the home appliance. For example, when the memory capacity available for storing the home appliance information is small, it is necessary for the home appliance to frequently upload the home appliance information to the server.

The technique disclosed by Patent Literature 1 is a conventional technique for sharing information accumulated in a server among specific members. According to Patent Literature 1, the server stores e-mail address data as key data for identifying identification information of a user terminal. When a user desires to share information, the user inputs e-mail address data of a different user terminal. When the inputted e-mail address data matches the e-mail address data stored in the server, data stored in the server is shared between the user terminal and the different user terminal.

However, the inventors have found that problems described below will arise from the above-described technique. That is, in the case where an e-mail address is used as key data when the information accumulated in the server is shared, the information could possibly be shared with someone with whom the information should not be shared, just by performing communication by e-mail. For that reason, there is a possibility that privacy information leaks.

In addition, when the information accumulated in the server is not shared, available home appliance information differs even between the family members who use the same home appliance, depending on the time when the home appliance information is transmitted to the server, and this results in a lack in the convenience for the users.

In order to solve the above-described problems, a home appliance information management apparatus according to an aspect of the present invention is a home appliance information management apparatus which collects, from a home electrical appliance, home appliance information which is information related to the home electrical appliance, and provides a user with to-be-provided information which is information obtained from the collected home appliance information, the home appliance information management apparatus including: a managing unit configured to manage the home appliance information; and a home appliance information holding unit configured to hold share information and the home appliance information in association with each other, the share information being for sharing the home appliance information and being associated with the user, wherein the managing unit is configured to, when a request for providing the to-be-provided information is issued by the user: refer to data held by the home appliance information holding unit; obtain home appliance information held in association with share information identical to the share information associated with the user; and provide the user with the to-be-provided information obtained from the obtained home appliance information.

With this, a user can share home appliance information (hereinafter, there are cases where the term "home appliance information" include the to-be-provided information) when the same share information has been set to the same home appliance. In addition, the home appliance information is not shared with a third party who has not set the same share code. More specifically, with the home appliance information management apparatus, by sharing the home appliance information only with a user who is associated with the same share information without sharing the home appliance history information with the third party, it is possible to share the home appliance information while preventing privacy information such as the home appliance information from being leaked.

In addition, for example, the home appliance information management apparatus may further include a communication unit which is connected, via a communication network, to a gateway terminal which receives the home appliance information from the home electrical appliance, and is configured to receive the home appliance information from the gateway terminal, wherein the managing unit may further be configured to: cause the home appliance information holding unit to store latest share information in association also with gateway identification information for identifying the gateway terminal, the latest share information being generated by a user associated with the gateway terminal; and when receiving the home appliance information from the gateway terminal, cause the home appliance information holding unit to store the received home appliance information as home appliance information of a user associated with the gateway identification information and the latest share information.

With this, in the case where home appliance information is automatically collected from a home appliance, it is possible to register home appliance information in association with a legitimate user by registering the received home appliance information as home appliance information of a user associated with the latest share information. Thus, with the home appliance information management apparatus, only the user who knows the latest share information can obtain the home appliance information, and thus it is possible to share the home appliance information while protecting privacy of the user.

In addition, for example, the managing unit may further be configured to, when receiving a control command for the home electrical appliance from the user, transmit the control command for controlling the home electrical appliance to the gateway terminal when the share information associated with the user is the latest share information.

With this, in remote control, only the user who knows the latest share information can transmit a control command, and thus it is possible to prevent a home appliance from being fraudulently operated.

In addition, for example, the home appliance information management apparatus may further include a communication unit which is connected, via a communication network, to a gateway terminal which receives the home appliance information from the home electrical appliance, and is configured to receive the home appliance information from the gateway terminal, wherein the managing unit may further be configured to: when registering the gateway terminal, cause the home appliance information holding unit to store the share information in association also with gateway identification information for identifying the gateway terminal, the share information being generated by a user registered in association with the gateway terminal; and when receiving share information and the home appliance information from the gateway terminal, cause the home appliance information holding unit to store the received home appliance information as home appliance information of a user associated with share information identical to the received share information.

With this, in the case where home appliance information is automatically collected from a home appliance, it is possible to register the home appliance information in association with share information by registering the share information, making it possible to prevent the home appliance information from being fraudulently obtained. In other words, with the home appliance information management apparatus, only the user who knows the share information registered on the gateway terminal can obtain the home appliance information, and thus it is possible to share the home appliance information while protecting privacy of the user.

In addition, for example, the managing unit may further be configured to, when receiving a control command for the home electrical appliance from the user, transmit the control command for controlling the home electrical appliance to the gateway terminal only when the share information associated with the user matches the share information received from the gateway terminal.

With this, in remote control, only the user who knows the share information registered on the gateway terminal can transmit a control command, and thus it is possible to prevent a home appliance from being fraudulently operated.

In addition, for example, the managing unit may further be configured to, when causing the home appliance information holding unit to store identification information of the home electrical appliance, cause the home appliance information holding unit to store the share information generated by the user.

With this, the home appliance information management apparatus registers share information when registering an home appliance, thereby setting the share information corresponding to the home appliance.

In addition, for example, the home appliance information holding unit may be configured to hold, as the share information, identification information of a group of users who are to be provided with the to-be-provided information, in association with the home appliance information, and the managing unit may be configured to, when a request for providing the to-be-provided information is issued by the user, refer to data held by the home appliance information holding unit and provide the user with the to-be-provided information.

With this, the home appliance information management apparatus registers, as share information, identification information of the group of users who are to be provided with home appliance information, thereby setting a community in which the home appliance information is to be shared.

In addition, for example, the managing unit may further be configured to: cause the home appliance information holding unit to store the share information when causing the home appliance information holding unit to store the identification information of the home electrical appliance in association with a first user; receive user identification information for identifying a second user when the first user selects the second user as a user who is to be provided with share information identical to the share information; and cause the home appliance information holding unit to store, in association with the second user, share information associated with the first user.

With this, it is possible for a user to share home appliance information only when the same community has been set to the same home appliance. In addition, the home appliance information is not shared with a third party who has not set the same community. In addition, it is possible to ask the user who has already registered the home appliance whether or not to set a community and then to set a community. This prevents a third party from setting a community without permission and obtaining the home appliance history information fraudulently. More specifically, with the home appliance information management apparatus, by sharing the home appliance information only with a user who has set the same community without sharing the home appliance information with the third party, it is possible to share the home appliance information while preventing privacy information such as the home appliance information from being leaked.

In addition, for example, the managing unit may further be configured to: cause the home appliance information holding unit to store identification information of a first user associated with identification information of the home electrical appliance when causing the home appliance information holding unit to store the identification information of the home electrical appliance; and receive user identification information for identifying a second user and cause the home appliance information holding unit to store user identification information for identifying the second user, in association with the identification information of the home electrical appliance, when the first user selects the second user as a user who is to be permitted to cause the home appliance information holding unit to store the identification information of the home appliance.

With this, it is possible to set the first user as a master to the home appliance, and to share home appliance information only with a user (the second user) who are invited by the master. In addition, a third party who is not invited by the master cannot execute home appliance registering processing. This prevents a third party from executing home appliance registering processing without permission and obtaining the home appliance information fraudulently. More specifically, with the home appliance information management apparatus, by sharing the home appliance information only with a user who has been invited by the master without sharing the home appliance information with the third party, it is possible to share the home appliance information while preventing privacy information such as the home appliance history information from being leaked.

In addition, for example, the managing unit may further be configured to: cause the home appliance information holding unit to store identification information of a first user associated with identification information of the home electrical appliance when causing the home appliance information holding unit to store the identification information of the home electrical appliance; transmit user identification information for identifying a second user for asking the first user whether or not registration is permitted when causing the home appliance information holding unit to store the identification information of the home electrical appliance in association with the second user; and cause the home appliance information holding unit to store user identification information of the second user in association with the identification information of the home electrical appliance only when receiving permission for registration from the first user.

With this, it is possible to set, to a home appliance, the first user as a master, and to allow only the user (the second user) who is authorized by the master can execute the home appliance registering processing. A third party who is not authorized by the master cannot execute the home appliance registering processing, and this prevents the third party from executing the home appliance registering processing without permission and obtaining the home appliance information fraudulently. More specifically, with the home appliance information management apparatus, by sharing the home appliance information only with a user who has been authorized by the master without sharing the home appliance information with the third party, it is possible to share the home appliance information while preventing privacy information such as the home appliance information from being leaked.

In addition, the present invention can be implemented not only as such a home appliance information management apparatus but also as a home appliance information sharing system which includes a home electrical appliance and the above-described home appliance information management apparatus.

In addition, the present invention can also be implemented as a home appliance information sharing method including, as steps, the characteristic processes performed by the home appliance information management apparatus described above. Furthermore, the present invention can also be implemented as a program causing a computer to execute the steps include in the home appliance information sharing method, or as a computer-readable recording medium having the program recorded thereon. It should be understood that such a program can be distributed via a recording medium such as a CD-ROM and a transmission medium such as the Internet. Furthermore, the present invention can be implemented as an integrated circuit provided with the characteristic processing units included in the home appliance information management apparatus. In addition, the present invention may be implemented as an arbitrary combination of the apparatus, method, integrated circuit, computer program, and recoding medium.

Hereafter, embodiments will be described based on the diagrams, it is to be noted that each of the exemplary embodiments described below shows a general or specific example. The numerical values, shapes, materials, structural elements, the arrangement and connection of the structural elements, steps, the processing order of the steps etc, shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

1. Configuration of a System

FIG. 1 is a diagram illustrating an overall configuration of a home appliance information sharing system 1 according to Embodiment 1. As illustrated in FIG. 1, the home appliance information sharing system 1 includes: a management apparatus 10; a mobile terminal 20; a mobile terminal 21; and a home appliance 30 mounted with an RFID tag 40. The mobile terminal 20 and the mobile terminal 21 have the same configuration and are, for example, mobile devices (mobile phones or smartphones, for example) mounted with a near field communication function.

The near field communication function according to this exemplary embodiment is, for example, a communication function specified by an RFID standard using the frequency of 13.56 MHz bandwidth. The RFID standards are defined in ISO 14443 Type A, ISO 14443 Type B, and ISO 15693. In addition, the near field communication function may be NFC (near field communication) standards which is the international standard of the near field communication technology developed so that these RFID standards can be treated collectively. The following describes the case where the communication implemented by the near field communication function is the RFID communication.

The management apparatus 10 corresponds to a home appliance information management apparatus. The management apparatus 10 is operated by a business operator who provides a service platform using a RFID tag. The management apparatus 10 collects home appliance information, and provides services such as distributing, to a user, to-be-provided information which is information obtained from the collected home appliance information. Examples of the services include presenting a user with use history such as a power consumption state of each home appliance, and transmitting control commands of home appliances or setting information of home appliances from the management apparatus 10. The details of the services are not the essential features of the present invention, and thus they will not be described in the exemplary embodiment.

It is to be noted that the home appliance information is, for example, information related to home appliances such as home appliance history information which will be described later, a device ID, a user ID, and so on. In addition, the to-be-provided information is information that can be generated from the home appliance information, such as visualization data which will be described later, and a variety of information items to be provided to a user.

The mobile terminals 20 and 21 read home appliance information accumulated in the home appliance 30 via the RFID tag 40, using a reader/writer function of the RFID. In addition, the mobile terminals 20 and 21 transmit the home appliance information read by the RFID communication 16 via the network 15 to the management apparatus 10.

2. Configuration of the Management Apparatus 10

Figure 2:
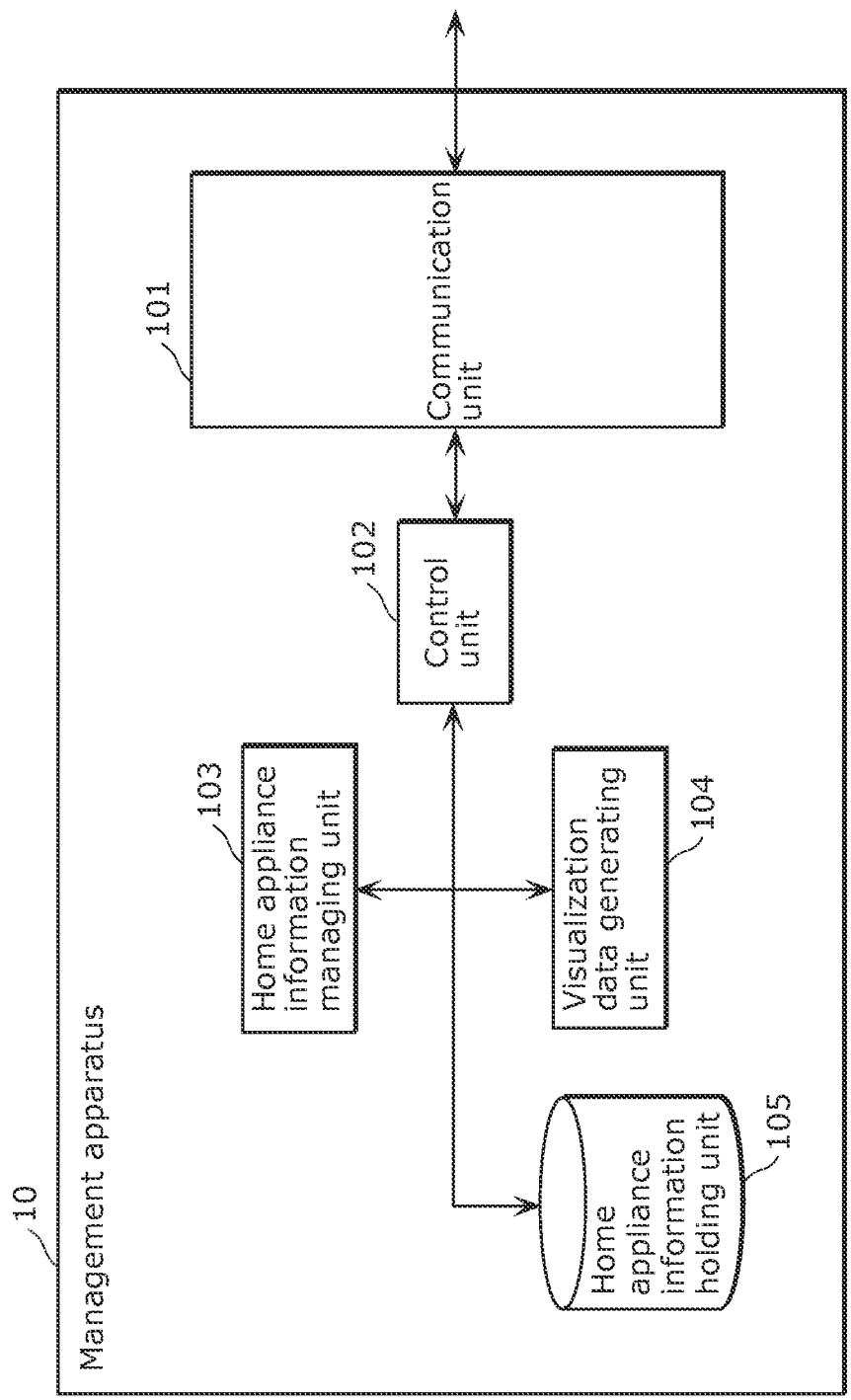
FIG. 2 is a configuration diagram of a management apparatus according to Embodiment 1.

FIG. 2 is a configuration diagram of the management apparatus 10 according to Embodiment 1. As illustrated in FIG. 2, the management apparatus 10 includes: a communication unit 101; a control unit 102; a home appliance information managing unit 103; a visualization data generating unit 104; and a home appliance information holding unit 105. It is to be noted that the control unit 102, the home appliance information managing unit 103, and the visualization data generating unit 104 each have a function as a managing unit for managing the home appliance information.

The communication unit 101 receives the home appliance information from the mobile terminals 20 and 21, and transmits the control command or setting information of the home appliance 30 to the mobile terminals 20 and 21.

The control unit 102 controls the home appliance information managing unit 103 or the visualization data generating unit 104. To be specific, the control unit 102 transmits the home appliance information received from the communication unit 101 to the home appliance information managing unit 103. In addition, the control unit 102 transmits the control command or the setting information of the home appliance which are generated by the home appliance information managing unit 103, to the mobile terminals 20 and 21 via the communication unit 101.

Furthermore, the control unit 102 receives the user ID and the device ID from the mobile terminals 20 and 21, and transmits an instruction for generating visualization data together with the user ID and the device ID to the visualization data generating unit 104. Then, the control unit 102 transmits the visualization data generated from the home appliance information by the visualization data generating unit 104, to the mobile terminals 20 and 21 via the communication unit 101. In sum, the control unit 102 provides the user with the visualization data which is the to-be-provided information obtained from the home appliance information. Here, the visualization data is data which indicates, for example, operation history of home appliances, eco-information, cumulative electricity expenses, and so on.

The home appliance information managing unit 103 records the home appliance information received from the control unit 102 on the home appliance information holding unit 105. More specifically, the home appliance information managing unit 103 updates a home appliance information list 1051 which will be described later, by causing the home appliance information holding unit 105 to store the received home appliance information. In addition, the home appliance information managing unit 103, when causing the home appliance information holding unit 105 to store identification information of the home electrical appliance, causes the home appliance information holding unit 105 to store share information generated by a user. Here, the share information is information for sharing home appliance information and associated with a user, and according to the exemplary embodiment, the share information is a share code which will be described later. In addition, the home appliance information managing unit 103 generates a control command or setting information of the home appliance, and transmits the control command or the setting information to the control unit 102.

The visualization data generating unit 104, when a request for providing the to-be-provided information is issued by a user, refers to the home appliance information list 1051 which is data held by the home appliance information holding unit 105 and will be described later, according to an instruction from the control unit 102, and obtains the home appliance information held in association with the same share information as the share information associated with the user. Then, the visualization data generating unit 104 generates visualization data as to-be-provided information which is to be provided to the user, using the obtained home appliance information. More specifically, the visualization data generating unit 104 receives a user ID and a device ID from the control unit 102, and generates visualization data of a home appliance of a user corresponding to the user ID, using the home appliance history information.

The home appliance information holding unit 105 is a memory which holds home appliance information and share information which is share information for sharing the home appliance information and which is associated with a user. More specifically, the home appliance information holding unit 105 holds a home appliance information list 1051 which is data in which a share code as the share information and the home appliance information such as history information of the home appliance or a device ID of the home appliance are associated with each other.

FIG. 3 is a diagram which illustrates an example of the home appliance information list according to Embodiment 1. The home appliance information list 1051 includes: the device ID for identifying the home appliance; the user ID for identifying a user; the share code used for sharing the home appliance history information; the home appliance history information; and the like.

The device ID is a unique ID for identifying a home appliance. In addition, the user ID is a unique ID for identifying a user. The share code is a code set by a user for sharing the home appliance history information with other users. The home appliance history information is operation history of the home appliance or setting information for the home appliance. For example, in the case where the home appliance is a refrigerator, the home appliance history information is the number of times that a door of the refrigerator is opened and closed, or the setting information for the temperature inside the refrigerator. It is to be noted that the home appliance information list 1051 may include information other than the information described above, such as information on power consumption of the home appliance.

3. Configuration of the Mobile Terminal 20

Figure 4:
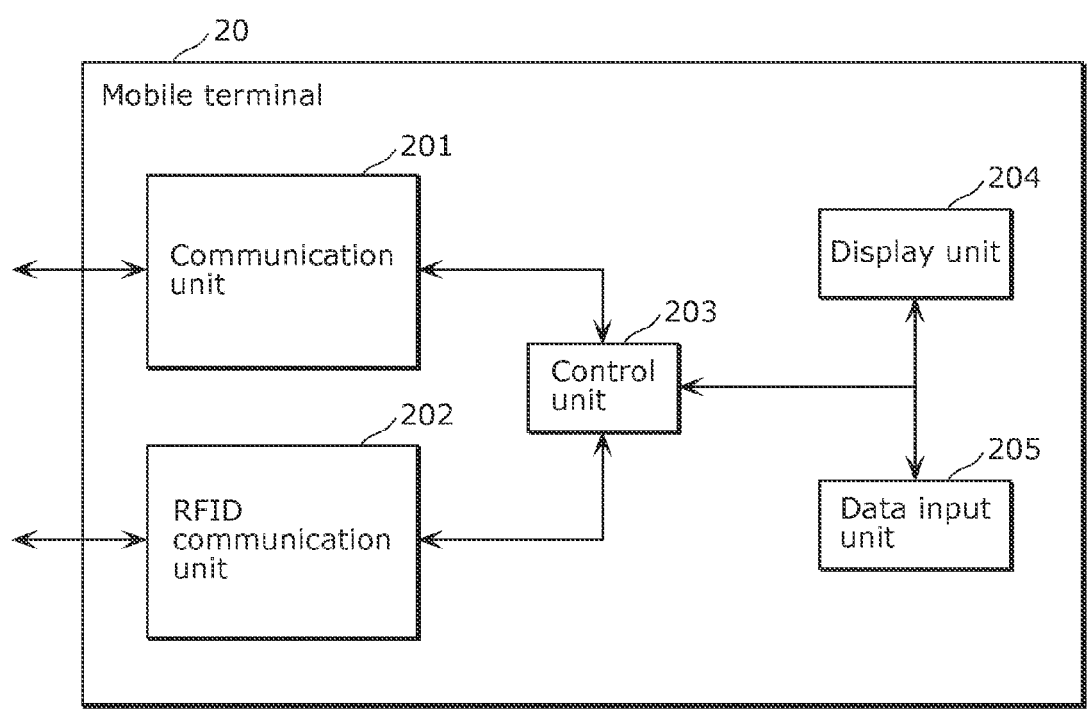
FIG. 4 is a configuration diagram of a mobile terminal according to Embodiment 1.

FIG. 4 is a functional block diagram of the mobile terminal 20 according to Embodiment 1. As illustrated in the diagram, the mobile terminal 20 includes: a communication unit 201; an RFID communication unit 202; a control unit 203; a display unit 204; and a data input unit 205. The mobile terminal 21 and the mobile terminal 20 have the same configuration, and thus description for the mobile terminal 21 will be omitted here.

The communication unit 201 performs communication with the management apparatus 10. More specifically, the communication unit 201 receives the visualization data, the control command for the home appliance, and the setting information, from the management apparatus 10. In addition, the communication unit 201 transmits, to the management apparatus 10, the user ID and a password inputted by the user via the data input unit 205, the share code, the home appliance information such as the home appliance history information collected from the home appliance 30, and the like.

The RFID communication unit 202 collects home appliance information from the home appliance 30 via the RFID communication. In addition, the RFID communication unit 202 transmits the control command or the setting information of the home appliance, to the home appliance 30 via the RFID communication.

The control unit 203 transmits the control command or the setting information of the home appliance which is received from the management apparatus 10 via the communication unit 201, to the home appliance 30 via the RFID communication unit 202. In addition, the control unit 203 transmits, to the display unit 204, a display instruction together with the visualization data received from the management apparatus 10. In addition, the control unit 203 transmits the user ID and the password inputted from the data input unit 205, or the share code to the management apparatus 10, via the communication unit 201.

The display unit 204 displays the visualization data generated by the management apparatus 10 according to the display instruction issued by the control unit 203. It is to be noted that the display unit 204, for example, is a display screen such as a touch panel, an LCD (liquid crystal display), or a CRT (cathode-ray tube).

The data input unit 205 receives, from a user, an input of the user ID and the password which are used for logging in to the management apparatus 10, and the share code which is used for sharing the home appliance information. It is to be noted that the data input unit 205 is an input operation unit such as a software keyboard, an input button, or the like.

4. Configuration of the Home Appliance 30

Figure 5:
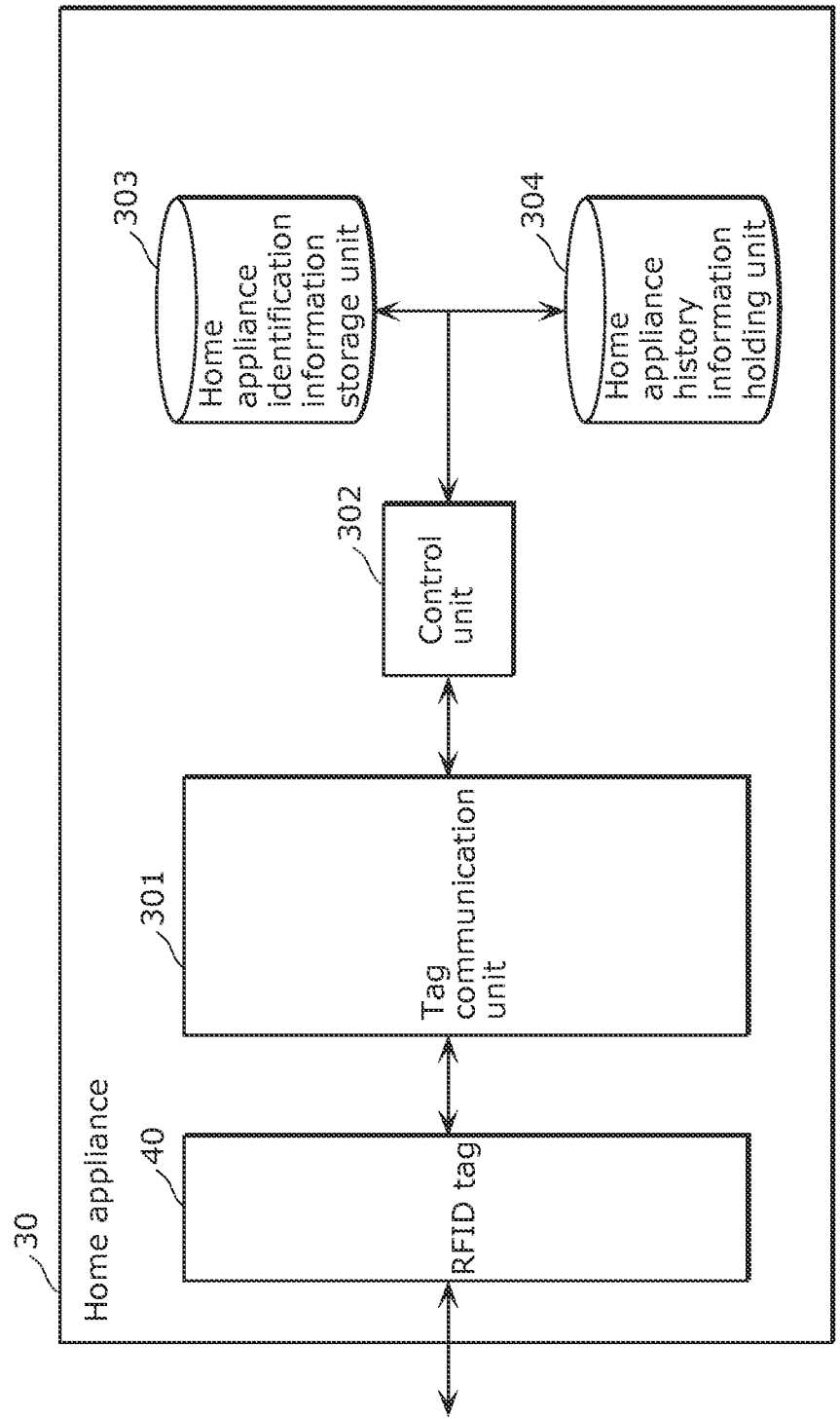
FIG. 5 is a configuration diagram of a home appliance according to Embodiment 1.

FIG. 5 is a functional block diagram of the home appliance 30 according to Embodiment 1. As illustrated in the diagram, the home appliance 30 includes: a tag communication unit 301; a control unit 302; a home appliance identification information storage unit 303; a home appliance history information holding unit 304; and an RFID tag 40.

The tag communication unit 301 controls communication with the RFID tag 40 and transmits home appliance information such as the home appliance history information to the mobile terminals 20 and 21 via the RFID communication.

The control unit 302, when the home appliance 30 is operated, causes the home appliance history information holding unit 304 to store the operation history of the home appliance 30 or the setting information set by a user. In addition, the control unit 302 controls the home appliance 30 based on the control command received from the mobile terminals 20 and 21 via the RFID communication.

The home appliance identification information storage unit 303 is a memory for storing the device ID which is a unique ID for identifying the home appliance 30.

The home appliance history information holding unit 304 is a memory for storing the home appliance history information such as the operation history of the home appliance 30.

5. Operation of the Home Appliance Registering Processing

First, the operation of the home appliance registering processing will be described, which is performed for registering the home appliance on the management apparatus 10.

Figure 6:
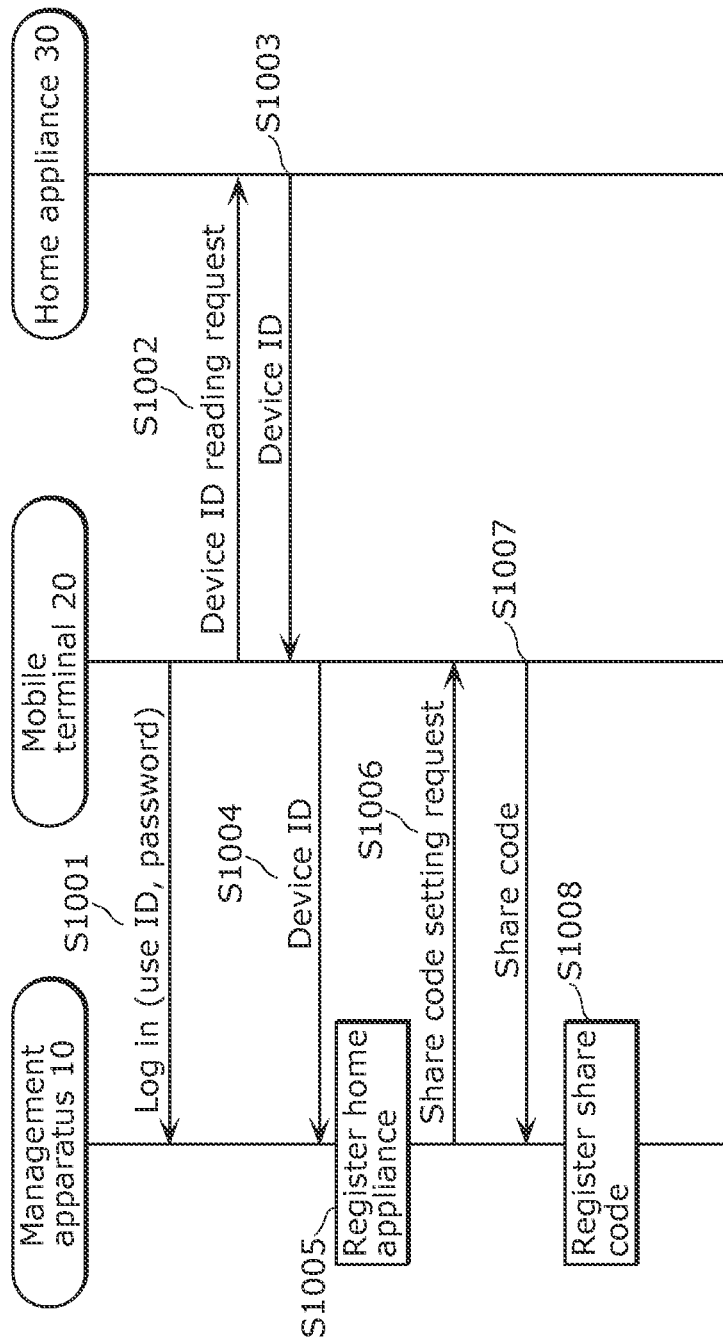
FIG. 6 is a sequence diagram which illustrates a flow of home appliance registering processing according to Embodiment 1.

FIG. 6 is a sequence diagram which illustrates a flow of the home appliance registering processing according to Embodiment 1.

The user who uses the mobile terminal 20 inputs a user ID and a password into the mobile terminal 20 via the data input unit 205 of the mobile terminal 20 in order to log in to the management apparatus 10. Then the control unit 203 of the mobile terminal 20 transmits the user ID and the password which are provided from the user, to the management apparatus 10 via the communication unit 201 (S1001).

Next, the control unit 203 of the mobile terminal 20 transmits, to the home appliance 30, a device ID reading request for identifying the home appliance 30, via the RFID communication unit 202, so that the home appliance 30 is registered on the management apparatus 10 (S1002).

Then, the tag communication unit 301 of the home appliance 30, upon receiving the device ID reading request from the mobile terminal 20, transmits the stored device ID to the mobile terminal 20 via the RFID communication (S1003).

The control unit 203 of the mobile terminal 20, upon receiving the device ID from the home appliance 30, transmits the received device ID together with a home appliance registration request to the management apparatus 10 via the communication unit 201, for registering the home appliance 30 (S1004).

Then, the control unit 102 of the management apparatus 10, upon receiving the home appliance registration request from the mobile terminal 20, registers the home appliance 30 in association with the received device ID and the user ID (a user ID of a logged-in user) (S1005). More specifically, the home appliance information managing unit 103 receives the device ID and the user ID via the control unit 102, and writes the device ID and the user ID, in association with each other, on the home appliance information list 1051 of the home appliance information holding unit 105, thereby carrying out registration of the home appliance 30.

Next, the control unit 102 of the management apparatus 10 transmits a share code setting request for sharing the home appliance history information, to the mobile terminal 20 via the communication unit 101 (S1006).

The control unit 203 of the mobile phone terminal 20, upon receiving the share code setting request from the management apparatus 10, urges the user to input a share code via the data input unit 205. Then the control unit 203 of the mobile terminal 20 transmits the share code provided by the user, to the management apparatus 10 via the communication unit 201 (S1007).

The control unit 102 of the management apparatus 10, upon receiving the share code from the mobile terminal 20, registers the received share code in association with the device ID and the user ID (S1008). More specifically, the home appliance information managing unit 103 receives the share code via the control unit 102, and writes the share code on the home appliance information list 1051, in association with the device ID and the user ID.

6. Operation of Home Appliance History Information Upload Processing

Next, the operation of home appliance history information upload processing will be described.

Figure 7:
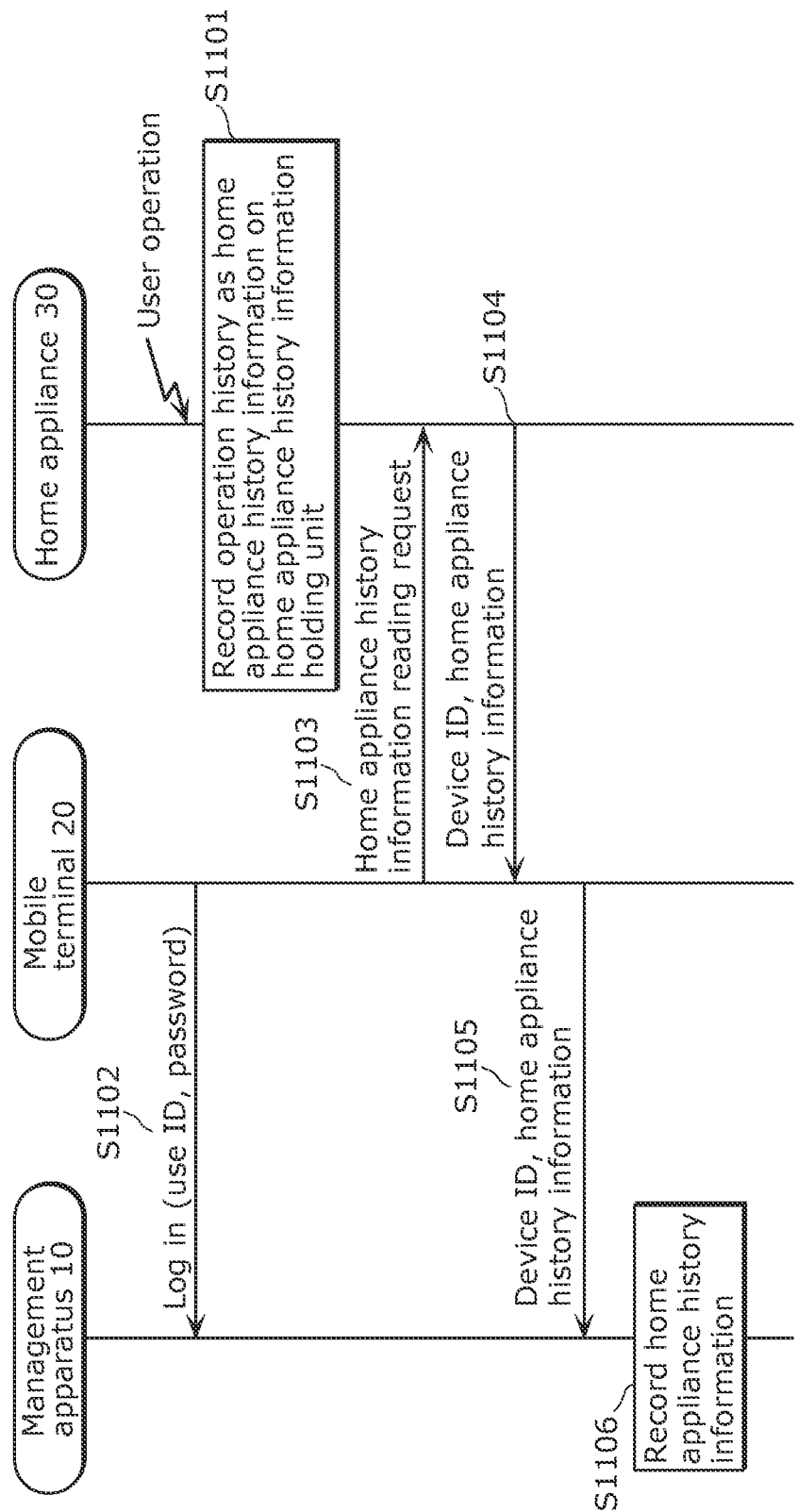
FIG. 7 is a sequence diagram which illustrates a flow of home appliance history information upload processing according to Embodiment 1.

FIG. 7 is a sequence diagram which illustrates a flow of the home appliance history information upload processing according to Embodiment 1.

First, the control unit 302 of the home appliance 30 records, on the home appliance history information holding unit 304, operation history of the home appliance 30 as the home appliance history information, every time a user operates the home appliance 30 (S1101).

In addition, the terminal 20 transmits, to the management apparatus 10, the user ID and the password which are provided by the user, for uploading the home appliance history information (S1102). In other words, the control unit 203 of the mobile terminal 20 transmits the user ID and the password to the management apparatus 10 via the communication unit 201. With this, the user logs in to the management apparatus 10.

Next, the control unit 203 of the mobile phone terminal 20 transmits a request for reading the device ID and the home appliance history information, as the home appliance history information reading request, to the home appliance 30 which needs to upload the home appliance history information, via the RFID communication unit 202 (S1103).

The tag communication unit 301 of the home appliance 30 which has received the home appliance history information reading request transmits, to the mobile terminal 20, the device ID stored in the home appliance identification information storage unit 303 and the home appliance history information recorded on the home appliance history information holding unit (S1104).

Then, the control unit 203 of the mobile terminal 20 transmits the device ID and the home appliance history information which are received from the home appliance 30, to the management apparatus 10 via the communication unit 201 (S1105).

Then the control unit 102 of the management apparatus 10 records, on the home appliance information holding unit 105, the device ID and the home appliance history information which are received from the mobile terminal 20, in association with the user ID received in Step S1102 (the user ID of the logged-in user) (S1106). More specifically, the home appliance information managing unit 103 receives the device ID and the home appliance history information via the control unit 102, and writes the device ID and the home appliance history information on the home appliance information list 1051, in association with the user ID.

FIG. 8 is a diagram which illustrates an example of the home appliance information list on which a user A is registered according to Embodiment 1. More specifically, FIG. 8 is a diagram which illustrates an example of a home appliance information list 1051A held by the home appliance information holding unit 105 after Step S1106. As illustrated in FIG. 8, the home appliance information managing unit 103 of the management apparatus 10 records home appliance history information on an area for the home appliance history information corresponding to the user ID associated with the received device ID.

7. Operation of Visualization Data Obtaining Processing

Next, the operation of visualization data obtaining processing will be described.

Figure 9:
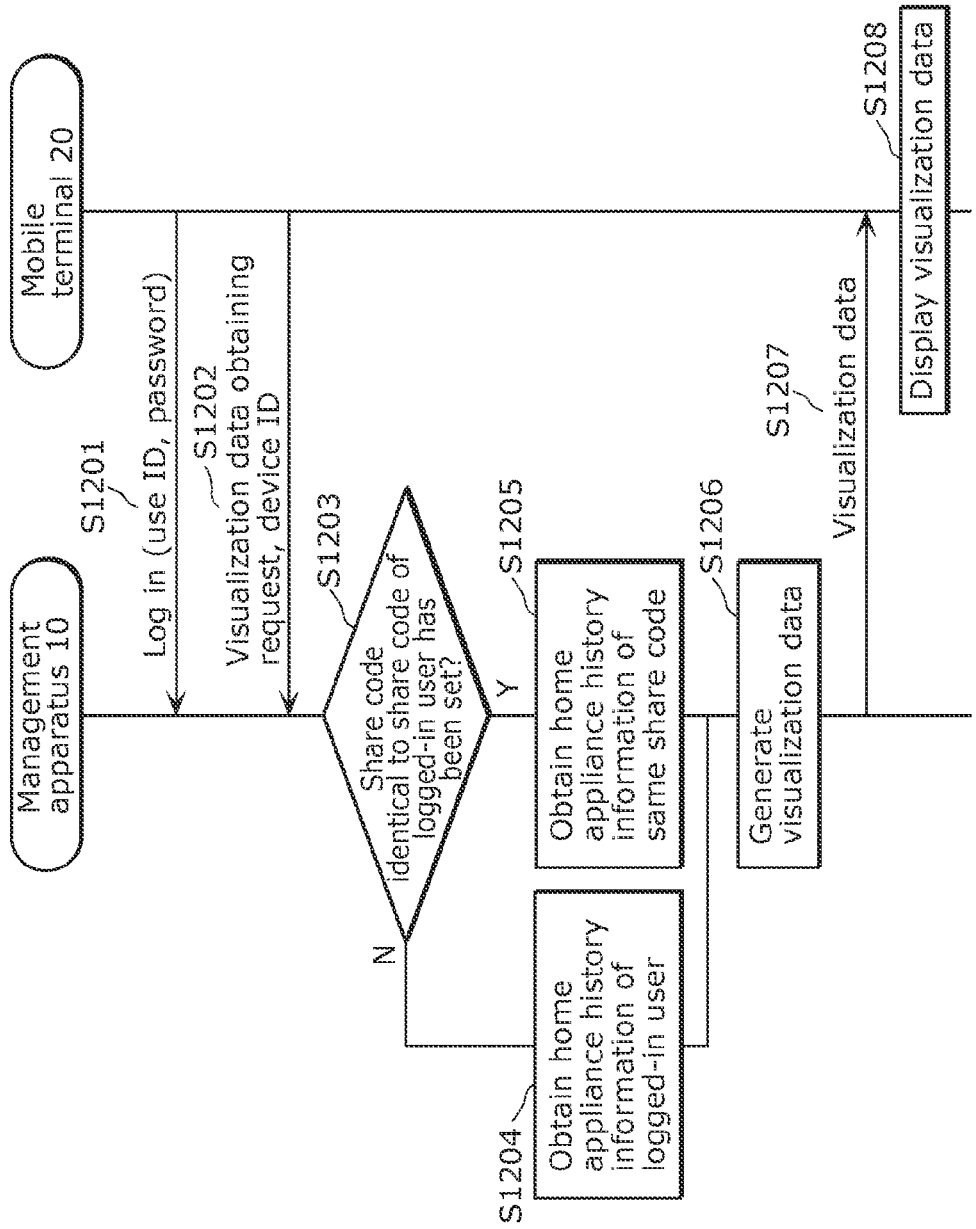
FIG. 9 is a sequence diagram which illustrates a flow of home appliance information obtaining processing according to Embodiment 1.

FIG. 9 is a sequence diagram which illustrates a flow of home appliance information obtaining processing according to Embodiment 1. More specifically, FIG. 9 is a sequence diagram which illustrates a flow of the visualization data obtaining processing.

A user who desires to obtain visualization data inputs a user ID and a password via the data input unit 205 of the mobile terminal 20 to log in to the management apparatus 10. Then the control unit 203 of the mobile terminal 20 transmits the user ID and the password which are provided by the user, to the management apparatus 10 via the communication unit 201 (S1201).

Next, the control unit 203 of the mobile terminal 20 transmits a visualization data obtaining request together with the device ID of the home appliance of which the visualization data is desired to be obtained, to the management apparatus 10 via the communication unit 201 (S1202).

Then, the control unit 102 of the management apparatus 10 receives the user ID (the user ID of a logged-in user), the device ID, and the visualization data obtaining request via the communication unit 101, and transmits the user ID, the device ID, and an instruction for generating visualization data to the visualization data generating unit 104. The visualization data generating unit 104 refers to the home appliance information list 1051 to retrieve the share code recorded thereon in association with the received user ID and device ID, thereby identifying the share code of the logged-in user. Then, the visualization data generating unit 104 refers to the home appliance information list 1051 to determine whether or not the same share code as the share code of the logged-in user has been set to a different user ID associated with the received device ID (S1203).

The visualization data generating unit 104, when it is determined that the same share code as the share code of the logged-in user has not been set (N in S1203), refers to the home appliance information list 1051 to obtain the home appliance history information associated with the user ID of the logged-in user (S1204).

The visualization data generating unit 104, when it is determined that the same share code as the share code of the logged-in user has been set (Y in S1203), refers to the home appliance information list 1051 to obtain the home appliance history information associated with the user ID of the logged-in user and home appliance history information associated with the different user ID to which the same share code as the share code of the logged-in user is set (S1205).

Then, the visualization data generating unit 104 generates visualization data from the obtained home appliance history information (S1206). More specifically, the visualization data generating unit 104 generates data which indicates, for example, operation history of the home appliance, eco-information, cumulative electricity expenses, and so on, using the home appliance history information of a user corresponding to the same share code as the share code of the logged-in user.

Then, the control unit 102 transmits the visualization data generated by the visualization data generating unit 104 to the mobile terminal 20 (S1207).

Then, the control unit 203 of the mobile terminal 20 displays the received visualization data on the display unit 204 (S1208).

7.1. Sharing of Home Appliance History Information when the Same Share Code is Set In Step S1203 of FIG. 9, when it is determined that the same share code as the share code of the logged-in user has been set to a different user ID, the home appliance history information associated with the different user ID is shared. A description will be given below with use of a specific example.

Figure 10:
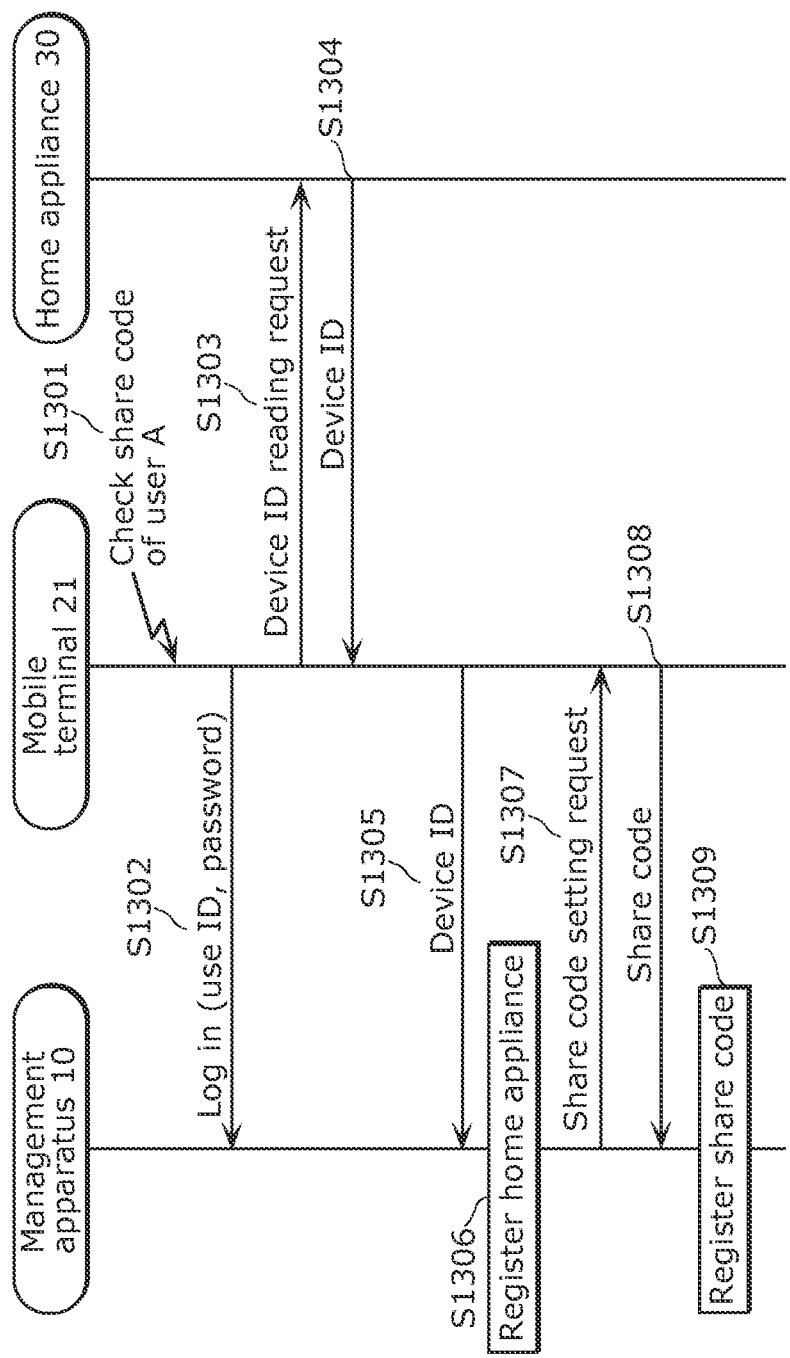
FIG. 10 is a sequence diagram which illustrates a flow of share code setting processing according to Embodiment 1.

FIG. 10 is a sequence diagram which illustrates a flow of share code setting processing according to Embodiment 1. More specifically, FIG. 10 is a sequence diagram which illustrates the flow of home appliance registering processing for the home appliance 30 by a user B who has the mobile terminal 21, which is performed subsequent to the home appliance registering processing for the home appliance 30 by the user A.

The user B who has the mobile terminal 21 checks the share code which has been set to the home appliance 30 by the user A, for sharing the home appliance history information with the user A (S1301). Subsequent processes of the home appliance registering processing (from S1302 to S1309) are equivalent to the processes of the home appliance registering processing illustrated in FIG. 6 (from S1001 to 1008), and thus description for them will be omitted here. In Step S1308, however, the share code transmitted from the mobile terminal 21 to the management apparatus 10 is the same share code as the share code which has been set by the user A.

FIG. 11 is a diagram which illustrates an example of the home appliance information list on which the user B is registered according to Embodiment 1. More specifically, FIG. 11 is a diagram which illustrates an example of a home appliance information list 1051B when the user A and the user B register the home appliance 30 using the same share code.

In the home appliance information list 1051B illustrated in FIG. 11, the user A and the user B have the same share code set to the device 30 corresponding to the same device ID. Thus, when a visualization data obtaining request is issued by the user A, the visualization data generating unit 104 of the management apparatus also obtains, in Step S1205, the home appliance history information of the user B who has the same share code set. Then, the visualization data generating unit 104 of the management apparatus 10 generates, in Step S1206, the visualization data using the home appliance history information of the user A and the home appliance history information of the user B.

8. Advantageous Effect

According to the above-described exemplary embodiment, the home appliance history information can be shared only when the same share code has been set to the same home appliance. In addition, the home appliance history information is not shared with a third party who has not set the same share code. More specifically, according to the exemplary embodiment, since the home appliance history information can be shared only with a user who has the same set share code without sharing the home appliance history information with the third party, it is possible to share the home appliance information while preventing privacy information such as the home appliance history information from leaking.

Embodiment 2

According to Embodiment 2, a community for sharing home appliance history information is set, so that the home appliance history information is shared between users who belong to the same community, and the home appliance history information is not shared with a user who belongs to a different community. The home appliance history information upload processing is the same as the home appliance history information upload processing in Embodiment 1, and thus description for that will here be omitted.

FIG. 12 is a diagram which illustrates an example of a home appliance information list 1052 according to Embodiment 2. The home appliance information list 1052 is different from the home appliance information list 1051 according to Embodiment 1 in that community identification information is recorded in place of the share code used for sharing the home appliance history information. In other words, the community identification information is the share information for sharing home appliance information. According to the example illustrated in FIG. 12, the community identification information is, when a user A and a user B belong to the same community, a community 1 for both of the user A and the user B, and a community 2 for a user C who belongs to a different community.

9. Operation of the Home Appliance Registering Processing

The operation of the home appliance registering processing according to Embodiment 2 will be described.

Figure 13:
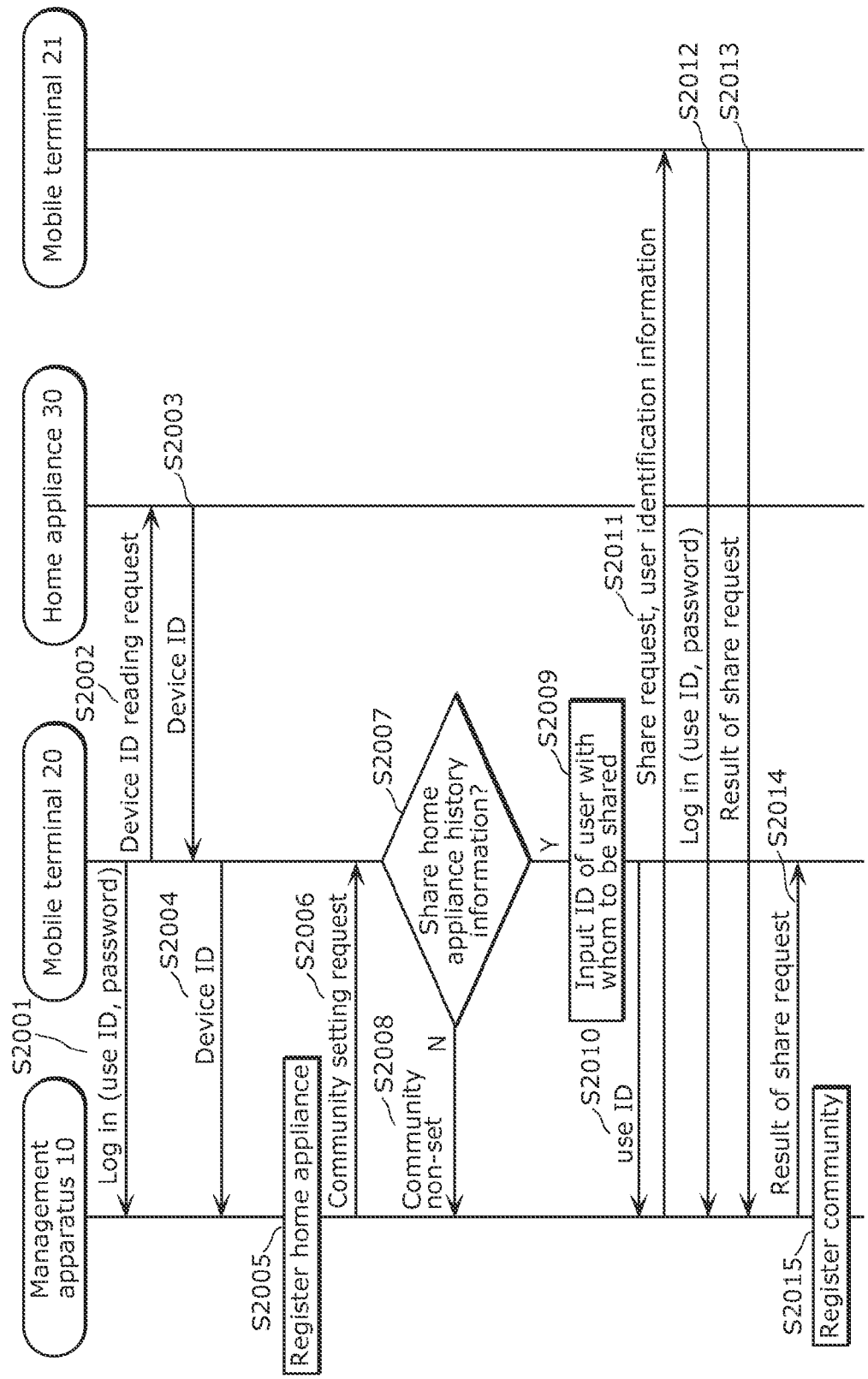
FIG. 13 is a sequence diagram which illustrates a flow of home appliance registering processing according to Embodiment 2.

FIG. 13 is a sequence diagram which illustrates a flow of the home appliance registering processing according to Embodiment 2. A specific description will be given here, taking as an example the case where the user B who has the mobile terminal 21 has already executed the home appliance registering processing for the home appliance 30, and the user A who has the mobile terminal 20 executes the home appliance registering processing for the home appliance 30 that is the same home appliance.

The user A who uses the mobile terminal 20 inputs a user ID and a password to the mobile terminal 20 via the data input unit 205 of the mobile terminal 20, in order to log in to the management apparatus 10. Then the control unit 203 of the mobile terminal 20 transmits the user ID and the password which are provided by the user, to the management apparatus 10 via the communication unit 201 (S2001).

Next, the control unit 203 of the mobile terminal 20 transmits a device ID reading request for identifying the home appliance 30, to the home appliance 30 via the RFID communication unit 202 so that the home appliance 30 is registered on the management apparatus 10 (S2002).

Then, the tag communication unit 301 of the home appliance 30, upon receiving the device ID reading request from the mobile terminal 20, transmits the stored device ID to the mobile terminal 20 via the RFID communication (S2003).

The control unit 203 of the mobile terminal 20, upon receiving the device ID from the home appliance 30, transmits the received device ID together with a home appliance registration request, to the management apparatus 10 via the communication unit 201, for registering the home appliance 30 (S2004).

Next, the home appliance information managing unit 103 of the management apparatus 10, upon receiving the home appliance registration request from the mobile terminal 20 via the control unit 102, registers the home appliance 30 on the home appliance information list 1052, such that the received device ID and the user ID of the logged-in user are associated with each other (S2005). In sum, the home appliance information managing unit 103 writes the device ID and the user ID, in association with each other, on the home appliance information list 1052, thereby carrying out registration of the home appliance 30.

Next, the control unit 102 of the management apparatus 10 transmits a community setting request for sharing the home appliance history information, to the mobile terminal 20 via the communication unit 101 (S2006).

The control unit 203 of the mobile terminal 20, upon receiving the community setting request from the management apparatus 10, asks the user A whether or not to share the home appliance history information (S2007). More specifically, the mobile terminal 20 displays, on the display unit 204, a screen image asking whether or not to share the home appliance history information, and determines whether or not to share the home appliance history information according to an entry of the user A provided from the data input unit 205.

Then, the control unit 203 of the mobile terminal 20, when it is determined that the home appliance history information is not to be shared (N in S2007), notifies the management apparatus 10 that a community is not to be set (S2008).

In addition, the control unit 203 of the mobile terminal 20, when it is determined that the home appliance history information is to be shared (Y in S2007), receives an entry of the user ID to be set to the same community, via the data input unit 205 from the user A (S2009). Then the control unit 203 of the mobile terminal 20 transmits the provided user ID to the management apparatus 10 (S2010).

Hereafter, description will be given assuming that a user ID of the user B who has the mobile terminal 21 on which the home appliance 30 has already been registered is inputted to the mobile terminal 20.

The control unit 102 of the management apparatus 10 refers to the home appliance information list 1052 to identify the user B based on the user ID received from the mobile terminal 20, and transmits a share request together with information which enables identifying of the user A, to the mobile terminal 21 of the user B (S2011). It is to be noted that the transmission method may be sending an e-mail to the mobile terminal 21, or when there is an application for managing the services, notification may be sent when the application is started up. In addition, the information which enables identifying of the user A may be a user ID of the user A or may be an e-mail address of the user A.

Next, the user B who has the mobile terminal 21 which has received the share request inputs the user ID and the password to the mobile terminal 21 for logging in to the management apparatus 10. The mobile terminal 21 transmits the provided user ID and the password to the management apparatus 10 (S2012).

Next, the user B determines whether or not to share the home appliance history information with the user A who has been identified based on the received identification information of the user A, and inputs the result of share request to the mobile terminal 21. Then the mobile terminal 21 transmits the result of share request to the management apparatus 10 (S2013).

The control unit 102 of the management apparatus 10 receives the result of share request from the mobile terminal 21, and transmits the result of share request to the mobile terminal 20 (S2014).

Next, the home appliance information managing unit 103 of the management apparatus 10 registers a community based on the result of share request (S2015). More specifically, the home appliance information managing unit 103 receives the result of share request via the control unit 102, and when the result of share request indicates that the home appliance history information is to be shared with the user A, writes on the home appliance information list 1052 so that the user A belongs to the same community as the community to which the user B belongs, thereby registering the community.

FIG. 14 is a diagram which illustrates an example of the home appliance information list on which the user A is registered according to Embodiment 2. More specifically, FIG. 14 is a diagram which illustrated an example of the home appliance information list 1052A when it is determined in Step S2013 that the user B shares the home appliance history information with the user A, and the home appliance information managing unit 103 of the management apparatus 10 registers the community in Step S2015.

As illustrated in the diagram, when it is determined that the user B shares the home appliance history information with the user A and the user A and the user B belong to the same community, the same community identification information is added to the community field of each of the user A and the user B.

10. Operation of Visualization Data Obtaining Processing

Next, the operation of visualization data obtaining processing according to Embodiment 2 will be described.

Figure 15:
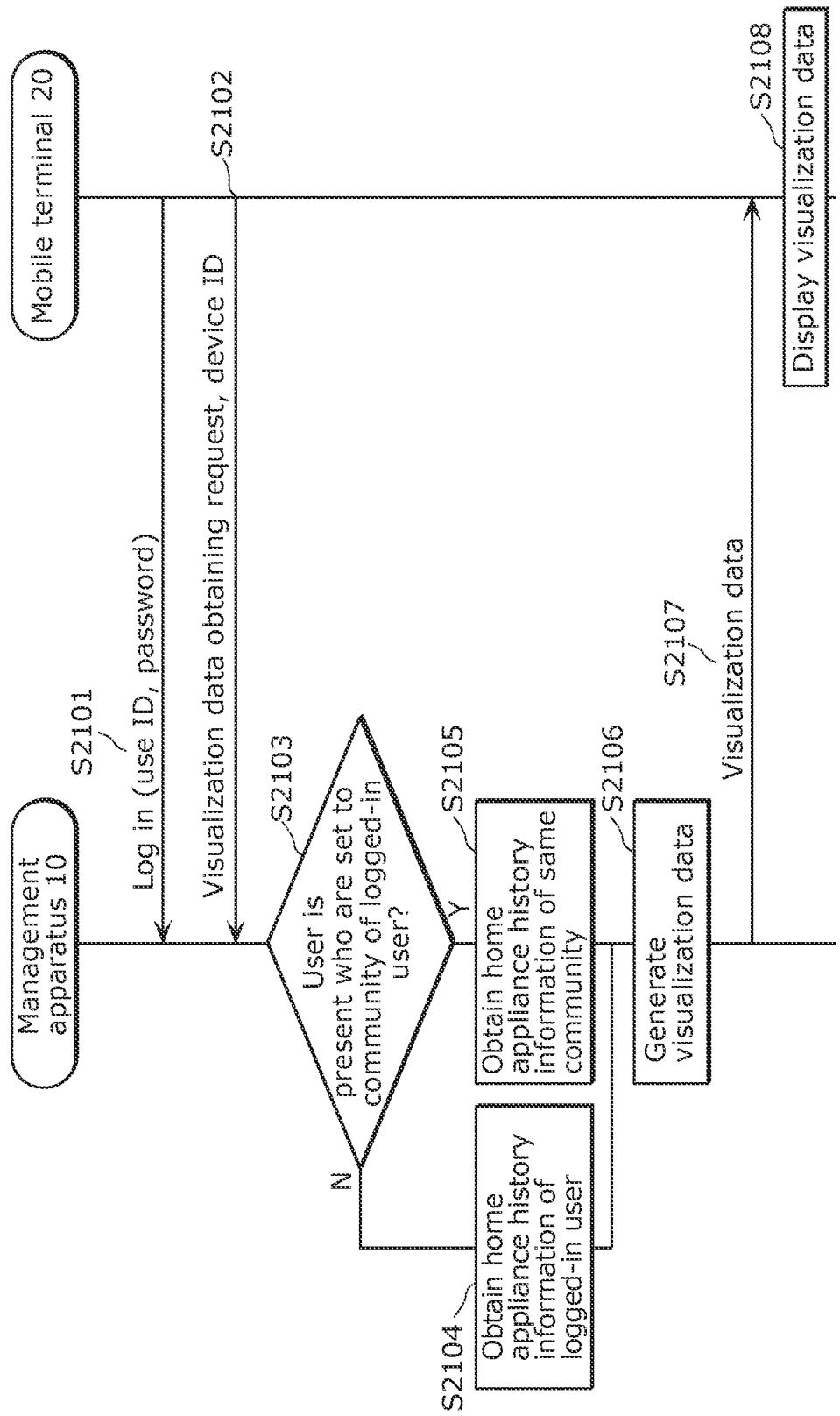
FIG. 15 is a sequence diagram which illustrates a flow of home appliance information obtaining processing according to Embodiment 2.

FIG. 15 is a sequence diagram which illustrates a flow of the home appliance information obtaining processing according to Embodiment 2. More specifically, FIG. 15 is a sequence diagram which illustrates a flow of the visualization data obtaining processing.

A user who desires to obtain visualization data inputs a user ID and a password via the data input unit 205 of the mobile terminal 20 for logging in to the management apparatus 10. Then the control unit 203 of the mobile terminal 20 transmits the user ID and the password which are provided by the user, to the management apparatus 10 via the communication unit 201 (S2101).

Next, the control unit 203 of the mobile terminal 20 transmits a visualization data obtaining request together with the device ID of the home appliance of which the visualization data is desired to be obtained, to the management apparatus 10 via the communication unit 201 (S2102).

Then, the control unit 102 of the management apparatus 10 receives the user ID (the user ID of a logged-in user), the device ID, and the visualization data obtaining request via the communication unit 101, and transmits the user ID, the device ID, and an instruction for generating visualization data to the visualization data generating unit 104. The visualization data generating unit 104 refers to the home appliance information list 1052 to retrieve the community identification information recorded thereon in association with the received user ID and device ID, thereby identifying the community of the logged-in user. Then, the visualization data generating unit 104 refers to the home appliance information list 1052 to determine whether or not the same community as the community of the logged-in user has been set to a different user ID associated with the received device ID (S2103).

The visualization data generating unit 104, when it is determined that the same community as the community of the logged-in user has not been set (N in S2103), refers to the home appliance information list 1052 to obtain the home appliance history information associated with the user ID of the logged-in user (S2104).

The visualization data generating unit 104, when it is determined that the same community as the community of the logged-in user is set (Y in S2103), refers to the home appliance information list 1052 to obtain the home appliance history information associated with the user ID of the logged-in user and home appliance history information associated with the different user ID to which the same community as the community of the logged-in user is set (S2105).

Then, the visualization data generating unit 104 generates visualization data from the obtained home appliance history information (S2106). More specifically, the visualization data generating unit 104 generates data which indicates, for example, operation history of the home appliance, eco-information, cumulative electricity expenses, and so on, using the home appliance history information of the different user ID who belongs to the same community as the community of the logged-in user.

Then, the control unit 102 transmits the visualization data generated by the visualization data generating unit 104 to the mobile terminal 20 (S2107).

Then, the control unit 203 of the mobile terminal 20 displays the received visualization data on the display unit 204 (S2108).

Generation of the visualization data when the same community is set will be described in detail, taking the home appliance information list 1052B illustrated in FIG. 16 as an example. FIG. 16 is a diagram which illustrates an example of the home appliance information list according to Embodiment 2. More specifically, FIG. 16 is a diagram which illustrates an example of the home appliance information list on which the home appliance 30 is registered by the user A and the user B.

In Step S2103, the visualization data generating unit 104 of the management apparatus 10 checks whether or not the same community as the community of the user A who has the mobile terminal 20 has been set to the home appliance information list 1052B. In the example of FIG. 16, the same community as the community of the user A has been set to the community field of the user B.

At this time, the visualization data generating unit 104 obtains home appliance history information items A1 to A3 of the user A and a home appliance history information item B1 of the user B in Step S2105. In addition, the visualization data generating unit 104 generates, in Step S2106, visualization data using the obtained home appliance history information items A1 to A3 and the home appliance history information B1.

As described above, the home appliance information holding unit 105 holds, in association with the home appliance information, the community identification information which is the identification information of a group of users who are provided with the to-be-provided information, as the share information.

In addition, the home appliance information managing unit 103, when causing the home appliance information holding unit 105 to store the identification information (device ID) of the home electrical appliance in association with the first user (user A), causes the home appliance information holding unit 105 to store the share information.

In addition, the home appliance information managing unit 103, when the first user selects the second user (user B) as a user to whom the same share information as the share information (community 1) of the first user is to be provided, receives the user identification information (user ID) which identifies the second user, and causes the home appliance information holding unit 105 to store the share information (community 1) associated with the first user in association with the second user.

Then the visualization data generating unit 104, when a request for providing the to-be-provided information is issued by the user, refers to the home appliance information list 1052 which is the data held by the home appliance information holding unit 105 and generates the visualization data as the to-be-provided information. Then the control unit 102 provides the user with the visualization data which is the to-be-provided information generated by the visualization data generating unit 104.

11. Advantageous Effect

According to the above-described exemplary embodiment, the home appliance history information can be shared only when the same community has been set to the same home appliance. In addition, the home appliance history information is not shared with a third party who has not set the same community. In addition, in this exemplary embodiment, whether or not to set a community is asked to the user who has already registered the home appliance, and then a community is set. This prevents a third party from setting a community without permission and obtaining the home appliance history information fraudulently. More specifically, according to the exemplary embodiment, since the home appliance history information can be shared only with a user who has the same set community without sharing the home appliance history information with the third party, it is possible to share the home appliance information while preventing privacy information such as the home appliance history information from being leaked.

Embodiment 3

According to Embodiment 3, one user who permits sharing of home appliance history information is set as a master for each of the home appliances. Then, management is carried out such that only a user who is invited by the master can register a home appliance, and a user who is not invited by a master cannot register a home appliance. With this, it is possible to share the home appliance history information between users who have been invited by the master. The home appliance history information upload processing is the same as the home appliance history information upload processing in Embodiment 1, and thus description for that will here be omitted.

FIG. 17 is a diagram which illustrates an example of a home appliance information list 1053 according to Embodiment 3. The home appliance information list 1053 is different from the home appliance information list 1051 according to Embodiment 1 in that information for identifying a master who permits sharing of home appliance history information is recorded in place of the share code used for sharing the home appliance history information. In other words, information for identifying the master is the share information for sharing home appliance information. For example, when the user A is the master for both the user B and the user C, information indicating that the user A is the master is the share information for sharing the home appliance information. According to Embodiment 3, the user who first performs the home appliance registering processing on the home appliance is the master.

12. Operation of the Home Appliance Registering Processing

The operation of the home appliance registering processing according to Embodiment 3 will be described.

Figure 18:
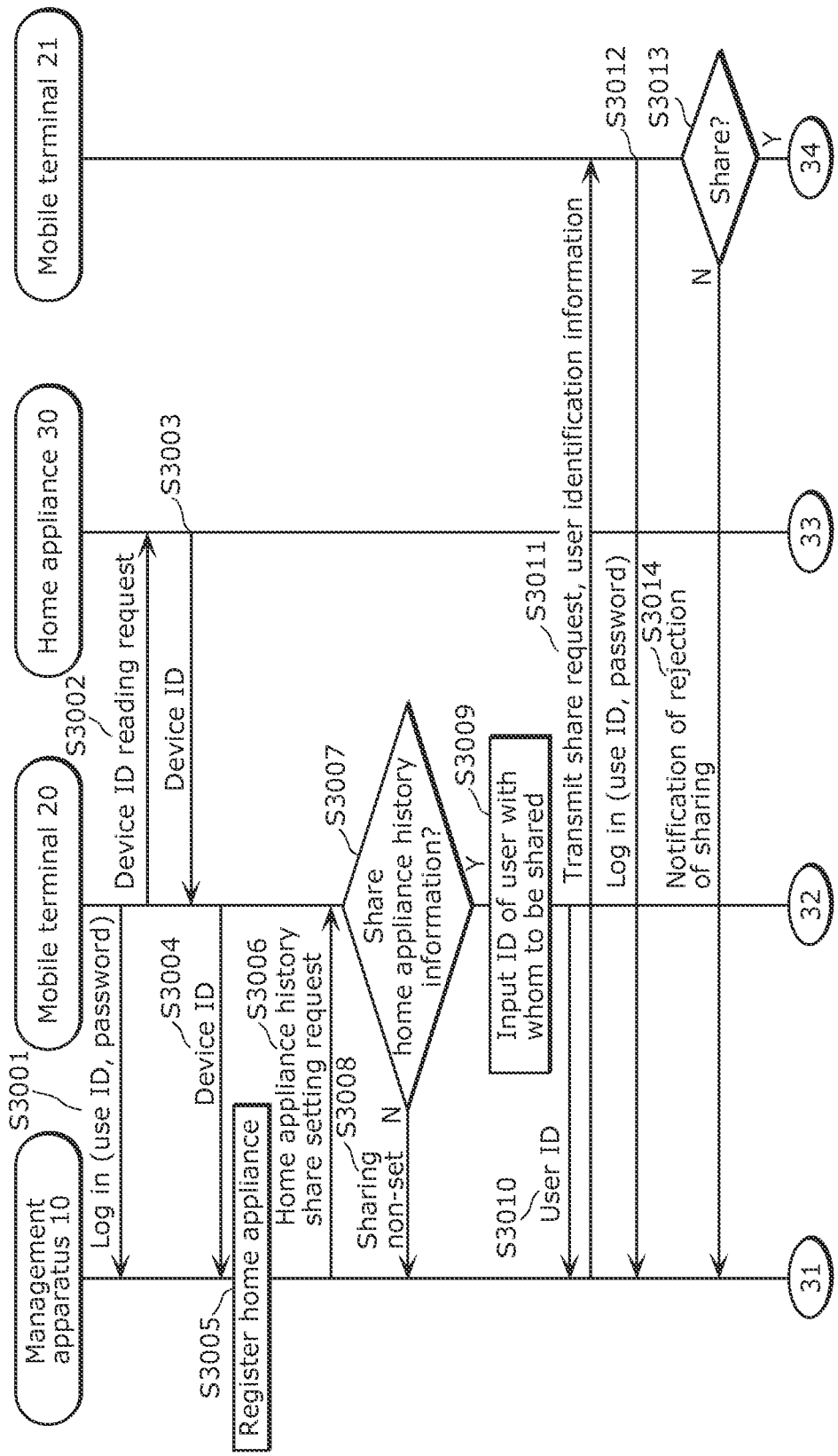
FIG. 18 is a sequence diagram which illustrates a flow of home appliance registering processing according to Embodiment 3.
Figure 19:
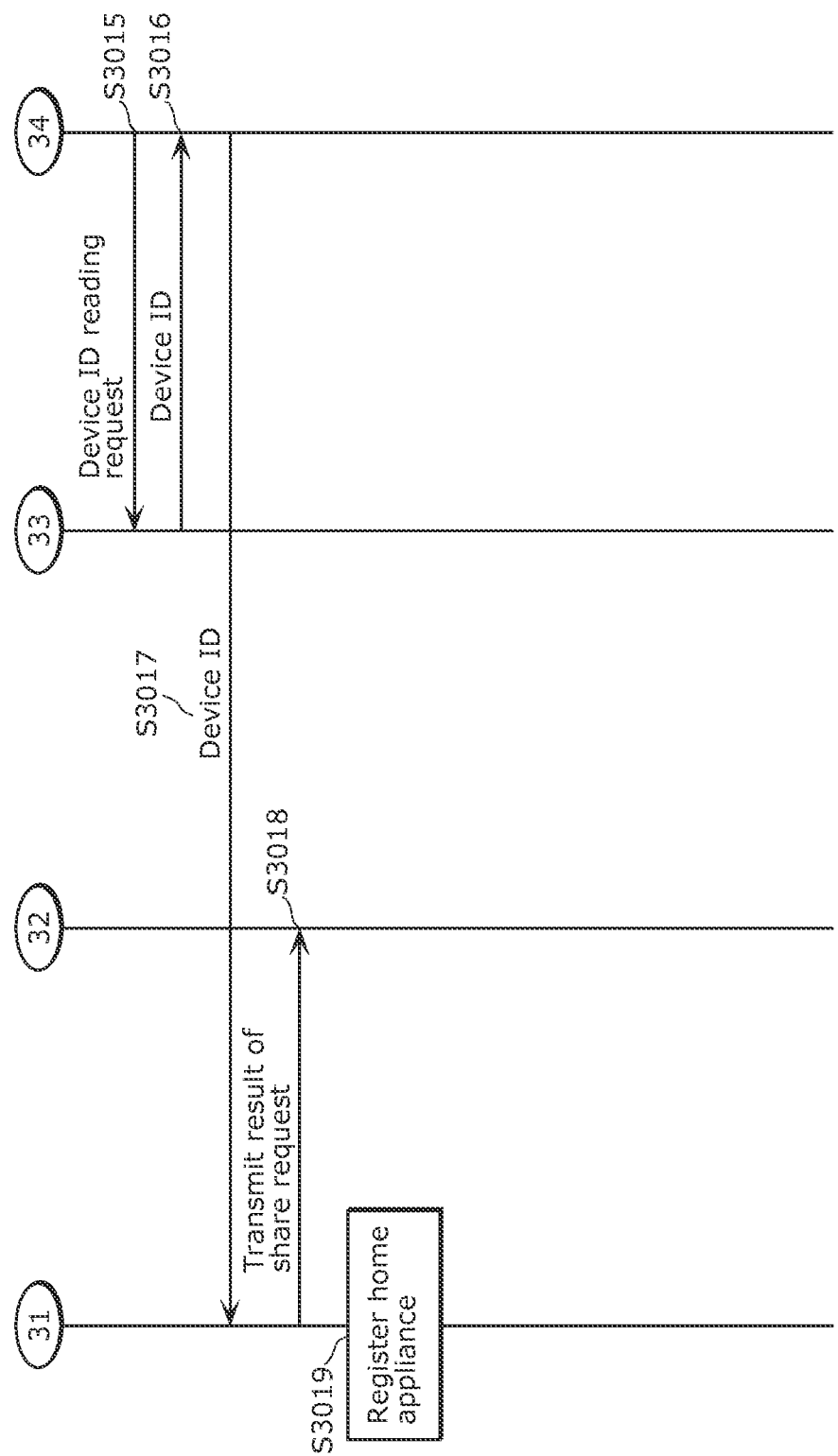
FIG. 19 is a sequence diagram which illustrates a flow of home appliance registering processing according to Embodiment 3.

FIG. 18 and FIG. 19 are sequence diagrams each illustrating a flow of the home appliance registering processing according to Embodiment 3.

A specific description will be given here, taking as an example the case where the user A who has the mobile terminal 20 executes the home appliance registering processing for the home appliance 30, and becomes a master.

The user A who uses the mobile terminal 20 inputs a user ID and a password to the mobile terminal 20 via the data input unit 205 of the mobile terminal 20, in order to log in to the management apparatus 10. Then the control unit 203 of the mobile terminal 20 transmits the user ID and the password which are provided by the user, to the management apparatus 10 via the communication unit 201 (S3001).

Next, the control unit 203 of the mobile terminal 20 transmits a device ID reading request for identifying the home appliance, to the home appliance 30 via the RFID communication unit 202 so that the home appliance 30 is registered on the management apparatus 10 (S3002).

Then, the tag communication unit 301 of the home appliance 30, upon receiving the device ID reading request from the mobile terminal 20, transmits the stored device ID to the mobile terminal 20 via the RFID communication (S3003).

Then, the control unit 203 of the mobile terminal 20, upon receiving the device ID from the home appliance 30, transmits the received device ID together with a home appliance registration request, to the management apparatus 10 via the communication unit 201, for registering the home appliance 30 (S3004).

Next, the home appliance information managing unit 103 of the management apparatus 10, upon receiving the home appliance registration request from the mobile terminal 20 via the control unit 102, registers the home appliance 30 on the home appliance information list 1053, such that the received device ID and the user ID of the logged-in user are associated with each other (S3005). In sum, the home appliance information managing unit 103 writes the device ID and the user ID, in association with each other, on the home appliance information list 1053, thereby carrying out registration of the home appliance 30.

Next, the control unit 102 of the management apparatus 10 transmits a share setting request for asking whether or not to share the home appliance history information, to the mobile terminal 20 via the communication unit 101 (S3006).

The control unit 203 of the mobile terminal 20, upon receiving the share setting request from the management apparatus 10, asks the user A whether or not to share the home appliance history information (S3007). More specifically, the mobile terminal 20 displays, on the display unit 204, a screen image asking whether or not to share the home appliance history information, and determines whether or not to share the home appliance history information according to an entry of the user A provided from the data input unit 205.

Then, the control unit 203 of the mobile terminal 20, when it is determined that the home appliance history information is not to be shared (N in S3007), notifies the management apparatus 10 that sharing of the home appliance history information is not to be set (S3008).

In addition, the control unit 203 of the mobile terminal 20, when it is determined that the home appliance history information is to be shared (Y in S3007), receives an entry of the user ID of a different user with whom the home appliance history information is to be shared, from the user A via the data input unit 205 (S3009). Then the control unit 203 of the mobile terminal 20 transmits the provided user ID to the management apparatus 10 (S3010).

Hereafter, description will be given assuming that the user ID which is provided by the user A is the user ID of the user B who has the mobile terminal 21.

The control unit 102 of the management apparatus 10 refers to the home appliance information list 1053 to identify the user B based on the user ID received from the mobile terminal 20, and transmits a share request together with the information which enables identifying of the user A, to the mobile terminal 21 of the user B (S3011). It is to be noted that the transmission method may be sending an e-mail to the mobile terminal 21, or when there is an application for managing the services, notification may be sent when the application is started up. In addition, the information which enables identifying of the user A may be a user ID of the user A or may be an e-mail address of the user A.

Next, the user B who has the mobile terminal 21 which has received the share request inputs the user ID and the password to the mobile terminal 21 for logging in to the management apparatus 10. The mobile terminal 21 transmits the provided user ID and the password to the management apparatus 10 (S3012).

Next, the user B determines whether or not to share the home appliance history information with the user A who has been identified based on the received identification information of the user A (S3013). More specifically, the mobile terminal 21 displays, on the display unit, a screen image asking whether or not to share the home appliance history information with the user A, and determines whether or not to share the home appliance history information with the user A according to an entry of the user B provided from the data input unit 205.

Then, the mobile terminal 21, when it is determined that the user B has rejected sharing of the home appliance history information with the user A (N in S3013), notifies the management apparatus 10 of rejection of sharing (S3014).

In addition, the mobile terminal 21, when it is determined that the user B intends to share the home appliance history information with the user A (Y in S3013), executes the registering processing of the home appliance. More specifically, the mobile terminal 21 transmits, to the home appliance 30, a device ID reading request for identifying the home appliance 30 (S3015).

Then, the tag communication unit 301 of the home appliance 30, upon receiving the device ID reading request from the mobile terminal 21, transmits the stored device ID to the mobile terminal 21 via the RFID communication (S3016).

Then the mobile terminal 21, upon receiving the device ID from the home appliance 30, transmits the received device ID together with the result of share request to the management apparatus 10 (S3017).

The control unit 102 of the management apparatus 10 receives the received device ID and the result of share request from the mobile terminal 21, and transmits the result of share request to the mobile terminal 20 (S3018).

Next, the home appliance information managing unit 103 of the management apparatus 10 executes registration of the home appliance 30 of the user B (S3019). More specifically, the home appliance information managing unit 103 receives the result of share request via the control unit 102, and when the result of share request indicates that the user B intends to share the home appliance history information, writes the user B, in association with the home appliance 30, on the home appliance information list 1053, thereby performing the registration of the home appliance 30 of the user B.

As described above, the home appliance information managing unit 103, when causing the home appliance information holding unit 105 to store the identification information (device ID) of the home electrical appliance, causes the home appliance information holding unit 105 to store the first user (user A) associated with the identification information of the home electrical appliance. In addition, the home appliance information managing unit 103, when the first user selects the second user (user B) as a user who is to be permitted to cause the home appliance information holding unit 105 to store the identification information of the home appliance, receives the user identification information for identifying the second user, and causes the home appliance information holding unit 105 to store the user identification information for identifying the second user in association with the identification information of the home appliance.

13. Operation of Visualization Data Obtaining Processing

Next, the operation of visualization data obtaining processing according to Embodiment 3 will be described.

Figure 20:
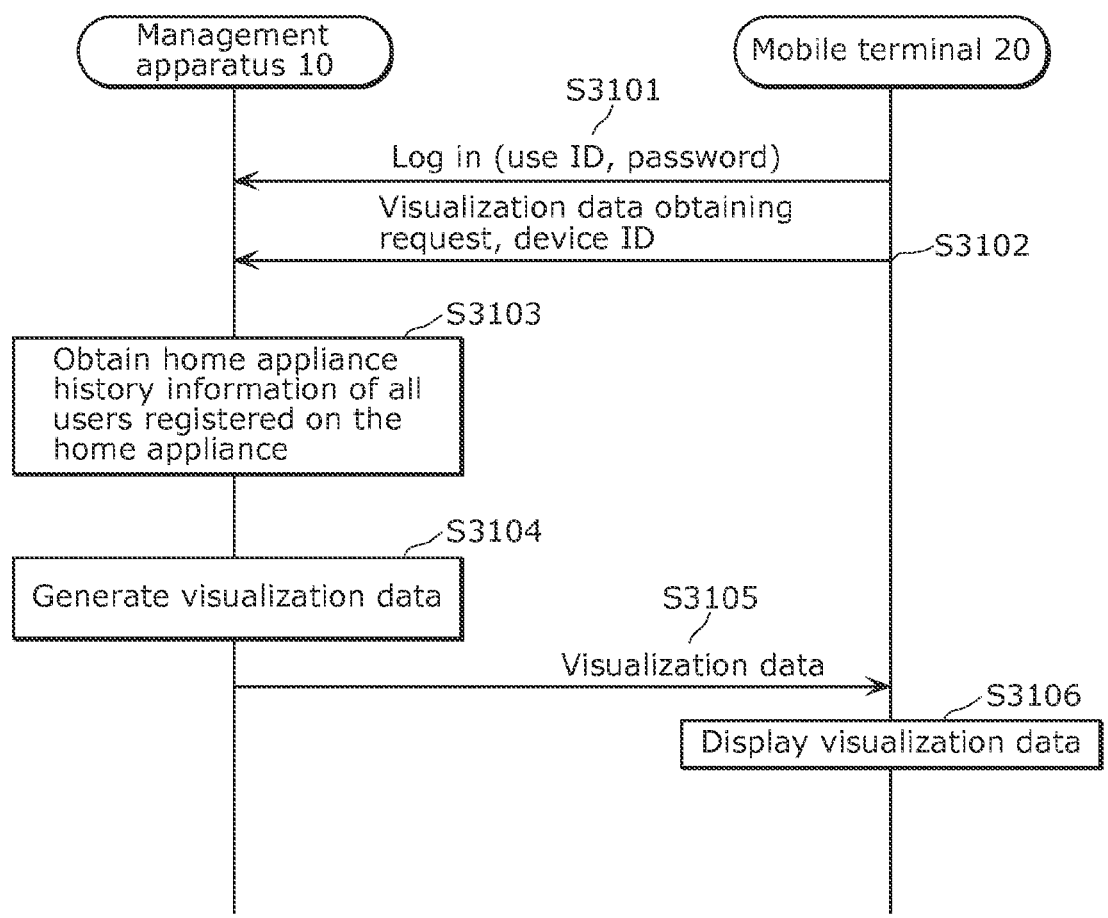
FIG. 20 is a sequence diagram which illustrates a flow of home appliance information obtaining processing according to Embodiment 3.

FIG. 20 is a sequence diagram which illustrates a flow of the home appliance information obtaining processing according to Embodiment 3. More specifically, FIG. 20 is a sequence diagram which illustrates a flow of the visualization data obtaining processing.

A user who desires to obtain visualization data inputs a user ID and a password via the data input unit 205 of the mobile terminal 20 for logging in to the management apparatus 10. Then the control unit 203 of the mobile terminal 20 transmits the user ID and the password which are provided by the user, to the management apparatus 10 via the communication unit 201 (S3101).

Next, the control unit 203 of the mobile terminal 20 transmits a visualization data obtaining request together with the device ID of the home appliance of which the visualization data is desired to be obtained, to the management apparatus 10 via the communication unit 201 (S3102).

Then the control unit 102 of the management apparatus 10 receives the user ID (the user ID of a logged-in user), the device ID, and the visualization data obtaining request, via the communication unit 101, and transmits the user ID, the device ID, and an instruction for generating visualization data to the visualization data generating unit 104. The visualization data generating unit 104 refers to the home appliance information list 1053 to confirm that the received user ID has been registered in association with the device ID, and obtains the home appliance history information of all of the registered users (S3103).

Then, the visualization data generating unit 104 of the management apparatus 10 generates visualization data from the obtained home appliance history information (S3104). More specifically, the visualization data generating unit 104 generates data which indicates, for example, operation history of the home appliance, eco-information, cumulative electricity expenses, and so on, using the home appliance history information of all of the users who have been registered.

Then the control unit 102 transmits the visualization data generated by the visualization data generating unit 104 to the mobile terminal 20 (S3105).

Then the control unit 203 of the mobile terminal 20 displays the received visualization data on the display unit 204 (S3106).

Generation of the visualization data when a plurality of users have been registered will be described in detail, taking the home appliance information list 1053A illustrated in FIG. 21 as an example, FIG. 21 is a diagram which illustrates an example of the home appliance information list on which the user B has been registered according to Embodiment 3. More specifically, FIG. 21 is a diagram which illustrates an example of the home appliance information list in which the user A is a master and on which the home appliance 30 has been registered by the user A and the user B.

In Step S3103, the visualization data generating unit 104 of the management apparatus 10 obtains home appliance history information items A1 to A3 of the user A and a home appliance history information item B1 of the user B. In addition, the visualization data generating unit 104 generates visualization data using the obtained home appliance history information items A1 to A3 and the home appliance history information B1 in Step S3104.

14. Advantageous Effect

According to the above-described exemplary embodiment, it is possible to set a master to a home appliance, and to share home appliance history information only with a user who are invited by the master. In addition, a third party who is not invited by the master cannot execute home appliance registering processing. This prevents the third party from executing the home appliance registering processing without permission and obtaining the home appliance history information fraudulently. More specifically, according to the exemplary embodiment, by sharing the home appliance history information only with a user who is invited by the master without sharing the home appliance history information with the third party, it is possible to share the home appliance information while preventing privacy information such as the home appliance history information from being leaked.

Embodiment 4

According to Embodiment 4, one user who permits sharing of home appliance history information is set as a master for each of the home appliances. Unlike Embodiment 3, management is carried out such that only a user who is authorized by the master can register a home appliance, and a user who is not authorized by a master cannot register a home appliance. With this, it is possible to share the home appliance history information between users who have been authorized by the master. The home appliance history information upload processing is the same as the home appliance history information upload processing in Embodiment 1, and thus description for that will here be omitted. In addition, the visualization data obtaining processing is the same as the visualization data obtaining processing in Embodiment 3, and thus description for that will here be omitted.

15. Operation of the Home Appliance Registering Processing

The operation of the home appliance registering processing according to Embodiment 4 will be described.

First, the operation of the home appliance registering processing for a home appliance on which a master is not registered will be described.

Figure 22:
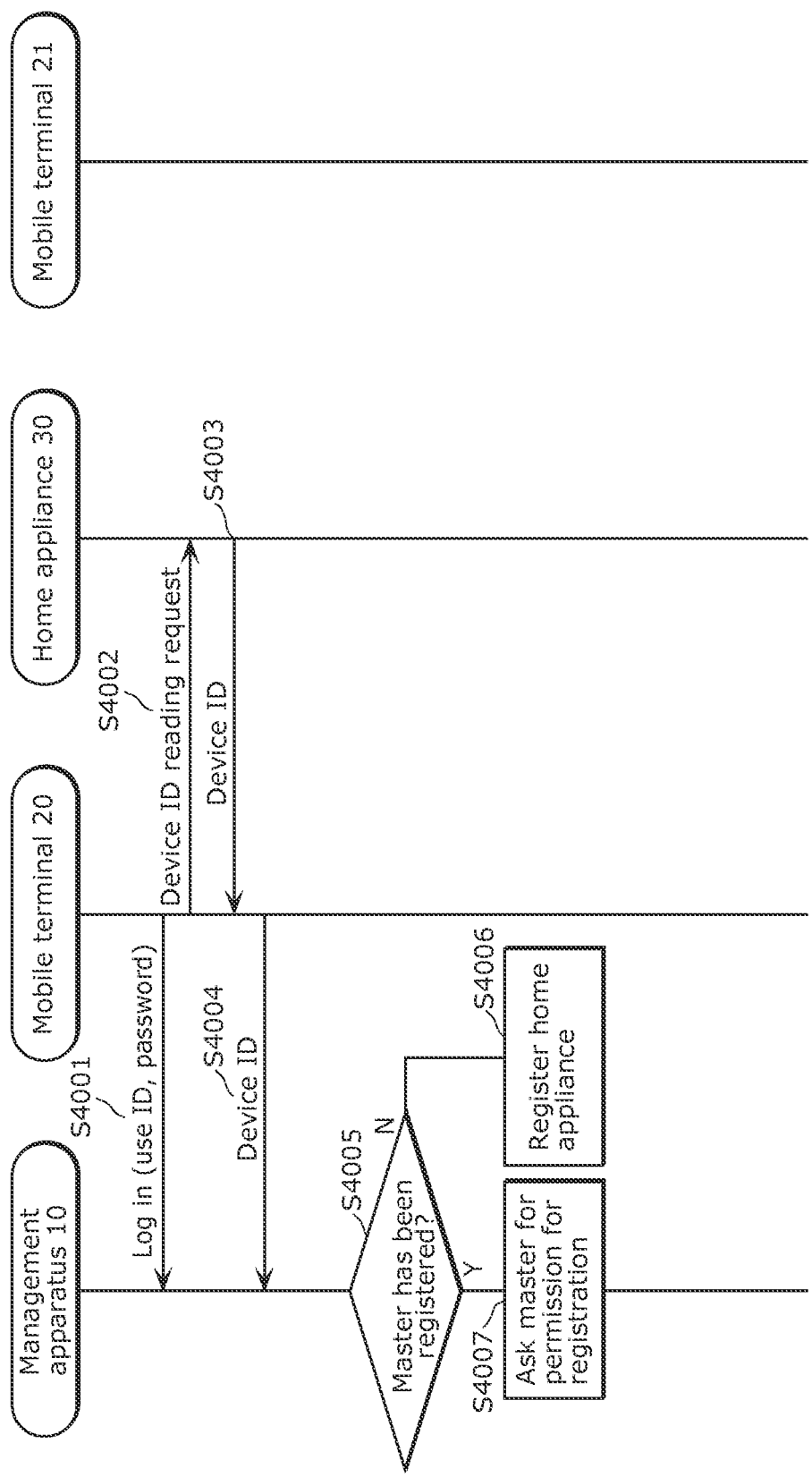
FIG. 22 is a sequence diagram which illustrates a flow of home appliance registering processing according to Embodiment 4.

FIG. 22 is a sequence diagram which illustrates a flow of the home appliance registering processing according to Embodiment 4. More specifically, FIG. 20 is a sequence diagram which illustrates a flow of the registering processing for a home appliance on which a master is to be registered.

A specific description will be given here, taking as an example the case where the user A who has the mobile terminal 20 executes the home appliance registering processing for the home appliance 30, and becomes a master.

The user A who uses the mobile terminal 20 inputs a user ID and a password to the mobile terminal 20 via the data input unit 205 of the mobile terminal 20, in order to log in to the management apparatus 10. Then the control unit 203 of the mobile terminal 20 transmits the user ID and the password which are provided by the user, to the management apparatus 10 via the communication unit 201 (S4001).

Next, the control unit 203 of the mobile terminal 20 transmits a device ID reading request for identifying the home appliance, to the home appliance 30 via the RFID communication unit 202 so that the home appliance 30 is registered on the management apparatus 10 (S4002).

Then, the tag communication unit 301 of the home appliance 30, upon receiving the device ID reading request from the mobile terminal 20, transmits the stored device ID to the mobile terminal 20 via the RFID communication (S4003).

Then, the control unit 203 of the mobile terminal 20, upon receiving the device ID from the home appliance 30, transmits the received device ID together with a home appliance registration request, to the management apparatus 10 via the communication unit 201, for registering the home appliance 30 (S4004).

Next, the home appliance information managing unit 103 of the management apparatus 10, upon receiving the home appliance registration request from the mobile terminal 20 via the control unit 102, determines whether or not a master is registered on the received device ID (S4005).

The home appliance information managing unit 103, when it is determined that the master is not registered (N in S4005), registers a home appliance on a home appliance information list with the user A being set as the master (S4006).

In addition, the home appliance information managing unit 103, when it is determined that the master has been registered (Y in S4005), asks the master for permission for registering the home appliance (S4007). Processes subsequent to the asking of permission for registering will be described later.

Next, the home appliance registering processing for a home appliance on which a master has been registered will be described.

Figure 23:
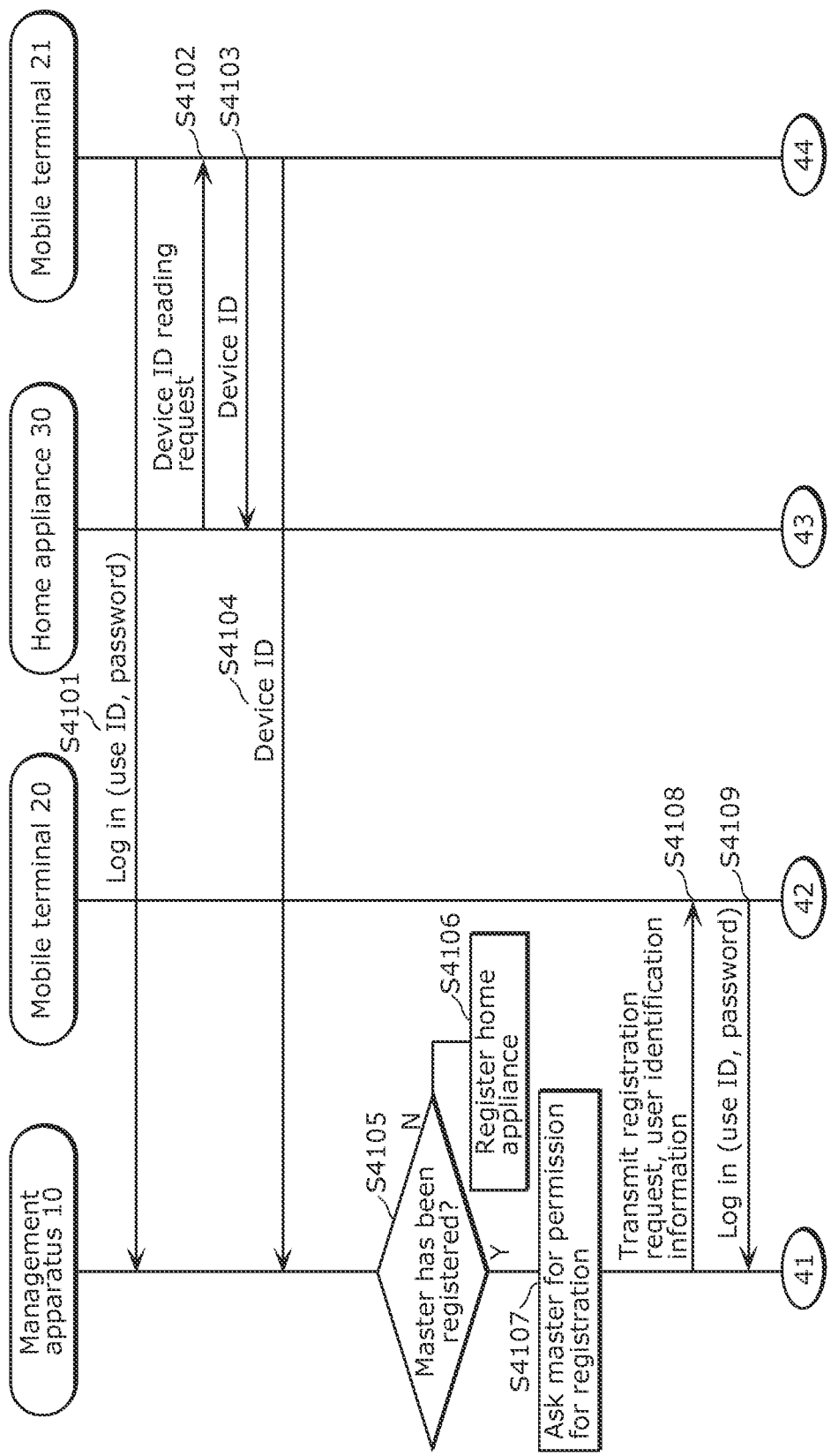
FIG. 23 is a sequence diagram which illustrates a flow of home appliance registering processing according to Embodiment 4.
Figure 24:
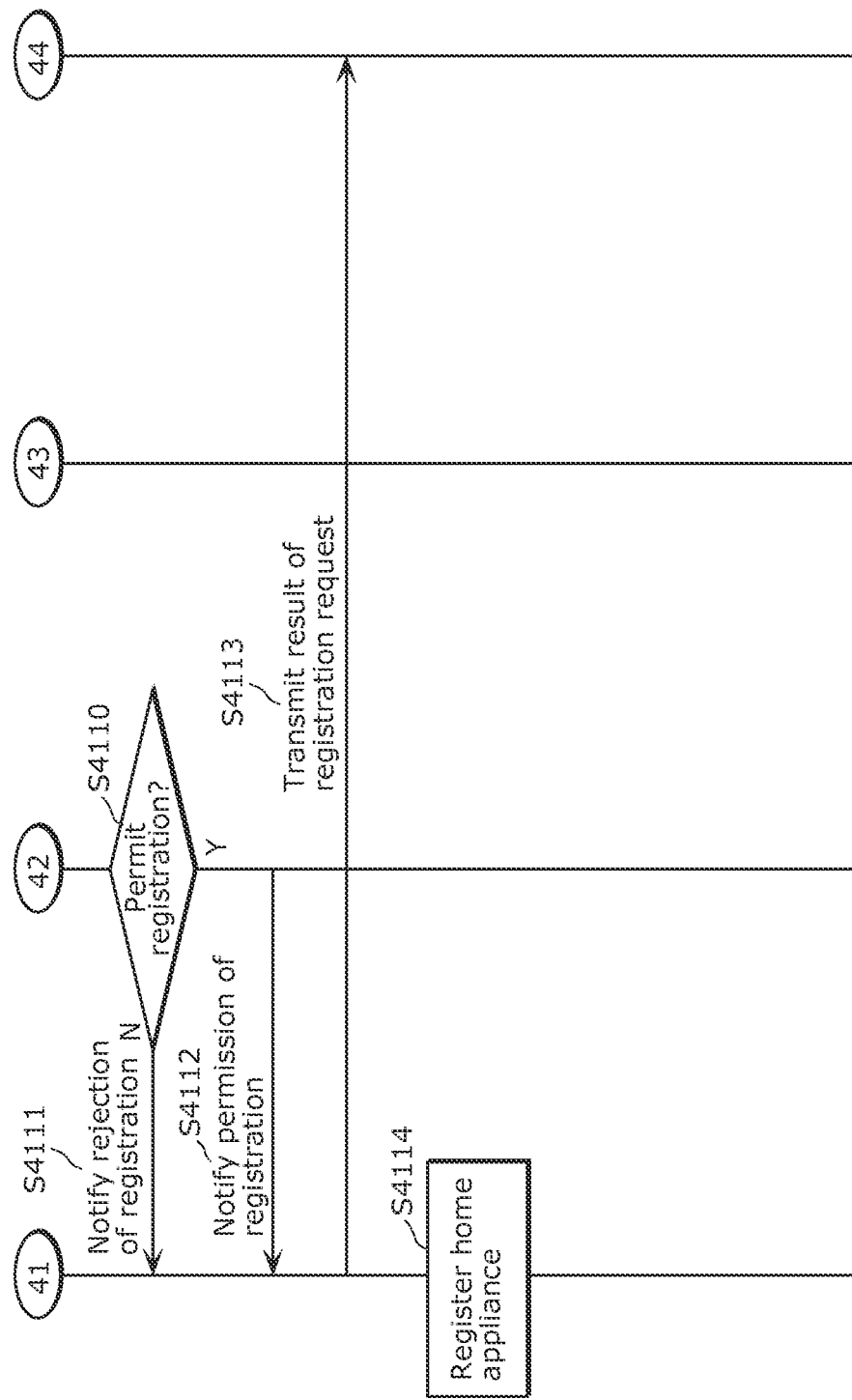
FIG. 24 is a sequence diagram which illustrates a flow of home appliance registering processing according to Embodiment 4.

FIG. 23 and FIG. 24 are sequence diagrams each illustrating a flow of the home appliance registering processing when a master has been registered, according to Embodiment 4.

A description will be given here, taking as an example the case where the user A who has the mobile terminal 20 has already been registered on the home appliance 30 as a master, and the user B who has the mobile terminal 21 newly registers a home appliance.

The user B who uses the mobile terminal 21 inputs a user ID and a password into the mobile terminal 21 for logging in to the management apparatus 10. The mobile terminal 21 transmits the provided user ID and the password to the management apparatus 10 (S4101).

The mobile terminal 21 transmits a device ID reading request for identifying the home appliance 30, to the home appliance 30 so that the home appliance 30 is registered on the management apparatus 10 (S4102). The home appliance 30, upon receiving the device ID reading request from the mobile terminal 21, transmits the stored device ID to the mobile terminal 21 (S4103). The mobile terminal 21, upon receiving the device ID from the home appliance 30, transmits the device ID together with the home appliance registration request to the management apparatus 10 for registering the home appliance (S4104).

Next, the home appliance information managing unit 103 of the management apparatus 10, upon receiving the home appliance registration request from the mobile terminal 21 via the control unit 102, refers to the home appliance information list, to determine whether or not a master is registered on the home appliance corresponding to the received device ID (S4105).

The home appliance information managing unit 103, when it is determined that the master is not registered (N in S4105), registers a home appliance on a home appliance information list with the user B being set as the master (S4106). Here, since the user A has already been registered as the master (Y in S4105), the home appliance information managing unit 103 asks the master for permission for registering the home appliance (S4107).

In other words, the home appliance information managing unit 103 transmits a home appliance registration request and the identification information of the user B who requests registration to the mobile terminal 20 (S4108). It is to be noted that the transmission method may be sending an e-mail to the mobile terminal 20, or when there is an application for managing the services, notification may be sent when the application is started up. In addition, the identification information of the user may be a user ID of the user or may be an e-mail address of the user.

The user A who has the mobile terminal 20 which has received the registration request inputs a user ID and a password via the data input unit 205 of the mobile terminal 20, in order to log in to the management apparatus 10. Then the control unit 203 of the mobile terminal 20 transmits the user ID and the password which are provided, to the management apparatus 10 via the communication unit 201 (S4109).

Next, the user A determines whether or not to permit registration of the home appliance of the user identified based on the received identification information of the user (S4110). More specifically, the mobile terminal 20 displays, on the display unit 204, a screen image asking whether or not to permit registration of the home appliance of the user B, and determines whether or not to permit the registration of the home appliance of the user B according to an entry of the user A provided from the data input unit 205.

Then, the control unit 203 of the mobile terminal 20, when it is determined that the user A has rejected the registration of the home appliance of the user B (N in S4110), notifies the management apparatus 10 of rejection of registration as a result of the registration request (S4111).

In addition, the control unit 203 of the mobile terminal 20, when it is determined that the user A permits the registration of the home appliance of the user B (Y in S4110), notifies the management apparatus 10 of permission for registration as a result of the registration request (S4112).

The control unit 102 of the management apparatus 10 transmits the received result of the registration request to the mobile terminal 21 (S4113). In addition, when the result of the registration request indicates that the registration is permitted (Y in S4110), the home appliance information managing unit 103 of the management apparatus 10 registers the home appliance 30 of the user B on the home appliance information list (S4114).

As described above, the home appliance information managing unit 103, when causing the home appliance information holding unit 105 to store the identification information (device ID) of the home electrical appliance, causes the home appliance information holding unit 105 to store the first user (user A) associated with the identification information of the home electrical appliance. In addition, the home appliance information managing unit 103, when causing the home appliance information holding unit 105 to store the identification information of the home electrical appliance in association with the second user (user B), transmits the user identification information for identifying the second user in order to ask the first user whether or not the registration is permitted. Then, the home appliance information managing unit 103, only when the permission for registration is received from the first user, causes the home appliance information holding unit 105 to store the user identification information of the second user in association with the identification information of the home electrical appliance.

16. Advantageous Effect

According to the above-described exemplary embodiment, it is possible to set a master to a home appliance and to execute the home appliance registering processing only for a user who is authorized by the master. Since a third party who is not authorized by the master cannot execute the home appliance registering processing, this prevents the third party from executing the home appliance registering processing without permission and obtaining the home appliance history information fraudulently. More specifically, according to the exemplary embodiment, by sharing the home appliance history information only with a user who is authorized by the master without sharing the home appliance history information with the third party, it is possible to share the home appliance information while preventing privacy information such as the home appliance history information from being leaked.

Embodiment 5

In Embodiment 5, a home appliance information sharing system 2 will be described in which home appliance information is automatically collected from a home appliance, and the home appliance information is shared between users who registered the home appliance.

17. Configuration of the System

Figure 25:
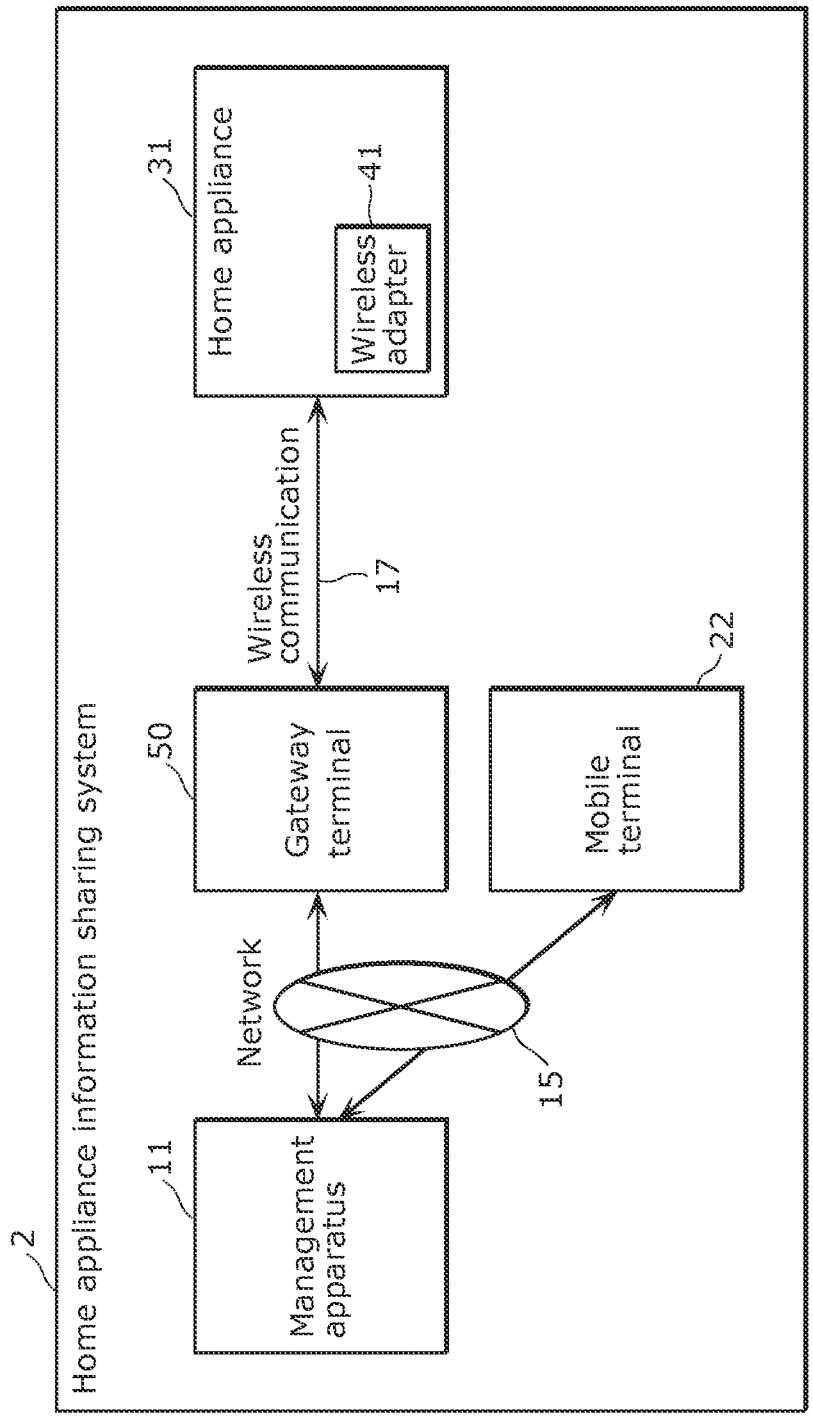
FIG. 25 is a diagram which illustrates an overall configuration of a home appliance information sharing system according to Embodiment 5.

FIG. 25 is a diagram illustrating an overall configuration of the home appliance information sharing system 2 according to Embodiment 5. As illustrated in FIG. 25, the home appliance information sharing system 2 includes: a management apparatus 11; a gateway terminal 50; a mobile terminal 22; and a home appliance 31 mounted with a wireless adapter 41.

The mobile terminal 22 is a mobile device such as a mobile phone and smartphone. According to Embodiment 5, the network between the gateway terminal 50 and the wireless adapter 41 is wireless communication 17. The wireless communication may be wireless LAN (IEEE802.11, etc.), Bluetooth (registered trademark), ZigBee, and specified low power radio, for example.

The management apparatus 11 is a home appliance information management apparatus which collects information on a home appliance and provides services. The details of the services are not the essential features of the present invention, and thus they will not be described in the exemplary embodiment.

The mobile terminal 22 displays home appliance information accumulated in the management apparatus 11, transmits a request for remotely controlling a home appliance, and the like.

The gateway terminal 50 communicates with the wireless adapter 41 and, when there is a change in a state of the home appliance 31 or an operation on the home appliance 31, transmits information to the management apparatus 11 via the network 15.

18. Configuration of the Management Apparatus 11

Figure 26:
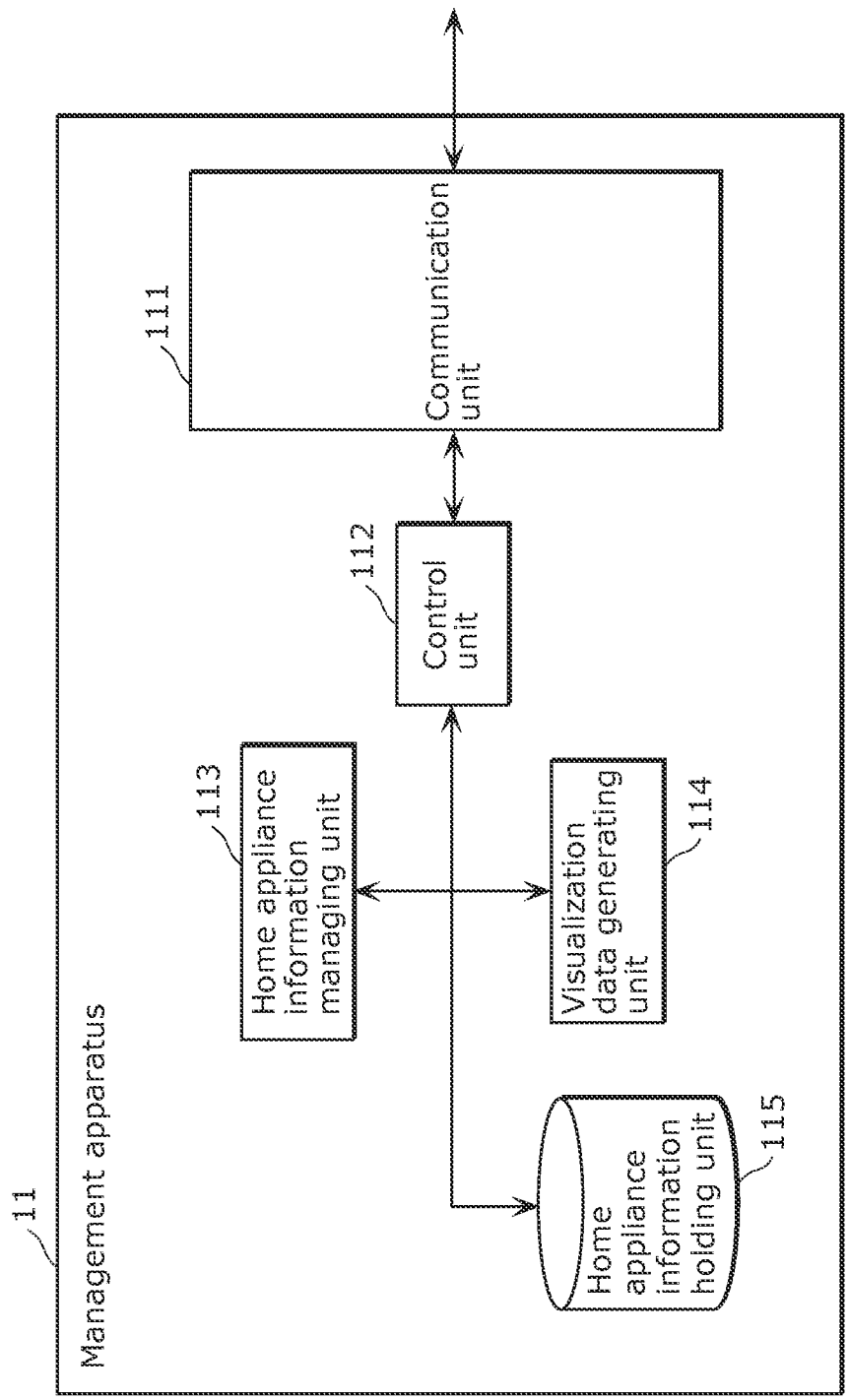
FIG. 26 is a configuration diagram of a management apparatus according to Embodiment 5.

FIG. 26 is a configuration diagram of the management apparatus 11 according to Embodiment 5. As illustrated in FIG. 26, the management apparatus 11 includes: a communication unit 111; a control unit 112; a home appliance information managing unit 113; a visualization data generating unit 114; and a home appliance information holding unit 115. It is to be noted that the control unit 112, the home appliance information managing unit 113, and the visualization data generating unit 114 each have a function as a managing unit for managing the home appliance information.

The communication unit 111 receives the home appliance information from the gateway terminal 50, and transmits the control command or setting information of the home appliance to the gateway terminal 50.

The control unit 112 controls the home appliance information managing unit 113 or the visualization data generating unit 114. To be specific, the control unit 112 transmits the home appliance information received from the communication unit 111 to the home appliance information managing unit 113. In addition, the control unit 112 transmits the control command or the setting information of the home appliance which are generated by the home appliance information managing unit 113, to the gateway terminal 50 via the communication unit 111.

Furthermore, the control unit 112 receives a user ID and a home electrical appliance ID from the mobile terminal 22, and transmits an instruction for generating visualization data together with the user ID and the home electrical appliance ID to the visualization data generating unit 114. Then, the control unit 112 transmits the visualization data generated by the visualization data generating unit 104, to the mobile terminal 22 via the communication unit 111. Here, the visualization data is data which indicates, for example, operation history of home appliances, eco-information, cumulative electricity expenses, and so on.

The home appliance information managing unit 113 records the home appliance information received from the control unit 112 on the home appliance information holding unit 115. More specifically, the home appliance information managing unit 113 updates a home appliance information list 1055 which will be described later, by causing the home appliance information holding unit 115 to store the received home appliance information. In addition, the home appliance information managing unit 113 generates control command or the setting information of the home appliance, and transmits the control command or the setting information to the control unit 112.

The visualization data generating unit 114 receives the user ID and the home electrical appliance ID from the control unit 112, and generates visualization data of a home appliance of a user corresponding to the user ID, using the home appliance history information.

The home appliance information holding unit 115 is a memory which holds home appliance information list 1055 which is a list of home appliance information items such as history information of the home appliance, the home electrical appliance ID of the home appliance, and so on.

FIG. 27 is a diagram which illustrates an example of a home appliance information list 1055 according to Embodiment 5. The home appliance information list 1055 includes: a GW device ID for identifying the gateway terminal; the home electrical appliance ID for identifying the home appliance; the user ID for identifying a user; a share password used for sharing the home appliance history information; and the home appliance history information, in other words, the share password is the share information for sharing home appliance information.

The GW device ID is a unique ID for identifying the gateway terminal. The home electrical appliance ID is a unique ID for identifying the home appliance. In addition, the user ID is a unique ID for identifying a user. The share password is a password which is set by a user for sharing the home appliance history information with a different user, or for remotely controlling the home appliance. The home appliance history information is operation history of the home appliance or setting information for the home appliance. It is to be noted that the home appliance information list 1055 may include information other than the information described above, such as information on power consumption of the home appliance.

19. Configuration of the Gateway Terminal 50

Figure 28:
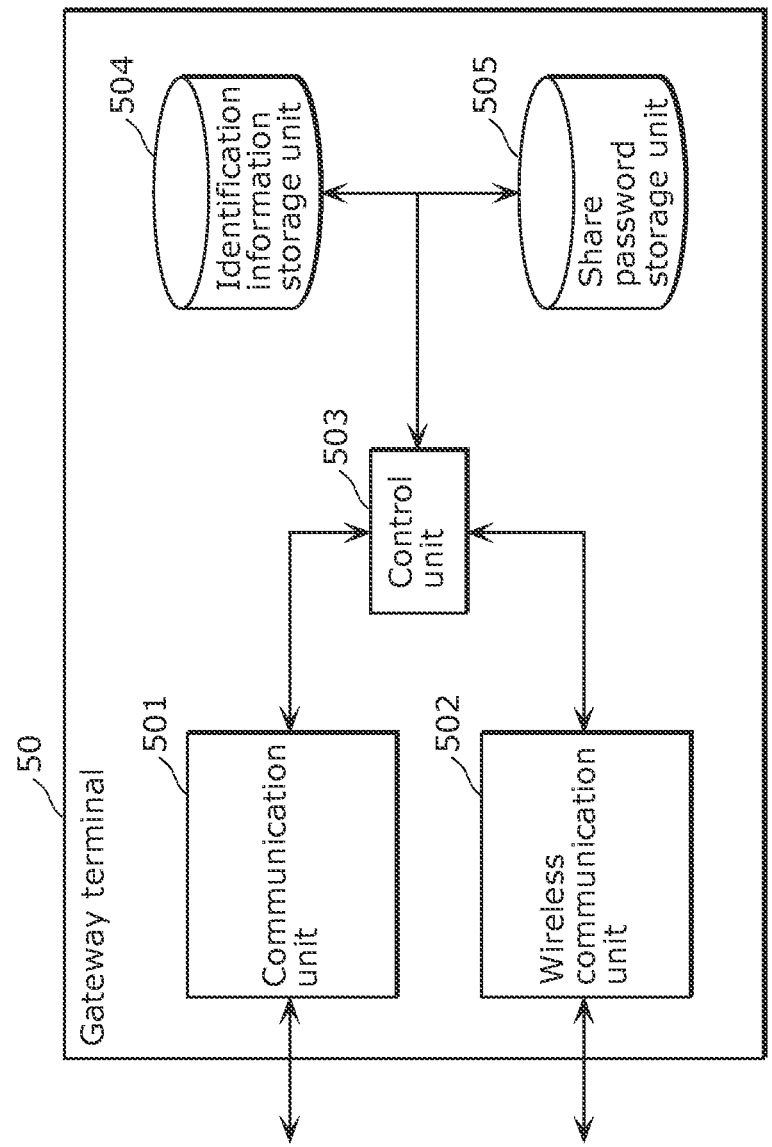
FIG. 28 is a configuration diagram of a gateway terminal according to Embodiment 5.

FIG. 28 is a functional block diagram of the gateway terminal 50 according to Embodiment 5. As illustrated in the diagram, the gateway terminal 50 includes: a communication unit 501; a wireless communication unit 502; a control unit 503; an identification information storage unit 504; a share password storage unit 505.

The communication unit 501 performs communication with the management apparatus 11. More specifically, the communication unit 501 receives the control command or the setting information of the home appliance from the management apparatus 11. In addition, the communication unit 501 transmits, to the management apparatus 11, the home appliance information such as home appliance history information collected from the home appliance 31.

The wireless communication unit 502 collects home appliance information from the home appliance 31 via wireless communication. In addition, the wireless communication unit 502 transmits the control command or the setting information of the home appliance, to the home appliance 31 via the wireless communication.

The control unit 503 transmits the control command or the setting information of the home appliance which is received from the management apparatus 11 via the communication unit 501, to the home appliance 31 via the wireless communication unit 502. In addition, the control unit 503 transmits the identification information of the gateway terminal which is stored in the identification information storage unit 504 via the communication unit 501. In addition, the control unit 503 stores the share password received from the management apparatus 11 to the share password storage unit 505.

The identification information storage unit 504 is a memory which stores the identification information of the gateway terminal 50.

The share password storage unit 505 is a memory which stores the share password received from the management apparatus 11.

20. Configuration of the Mobile Terminal 22

Figure 29:
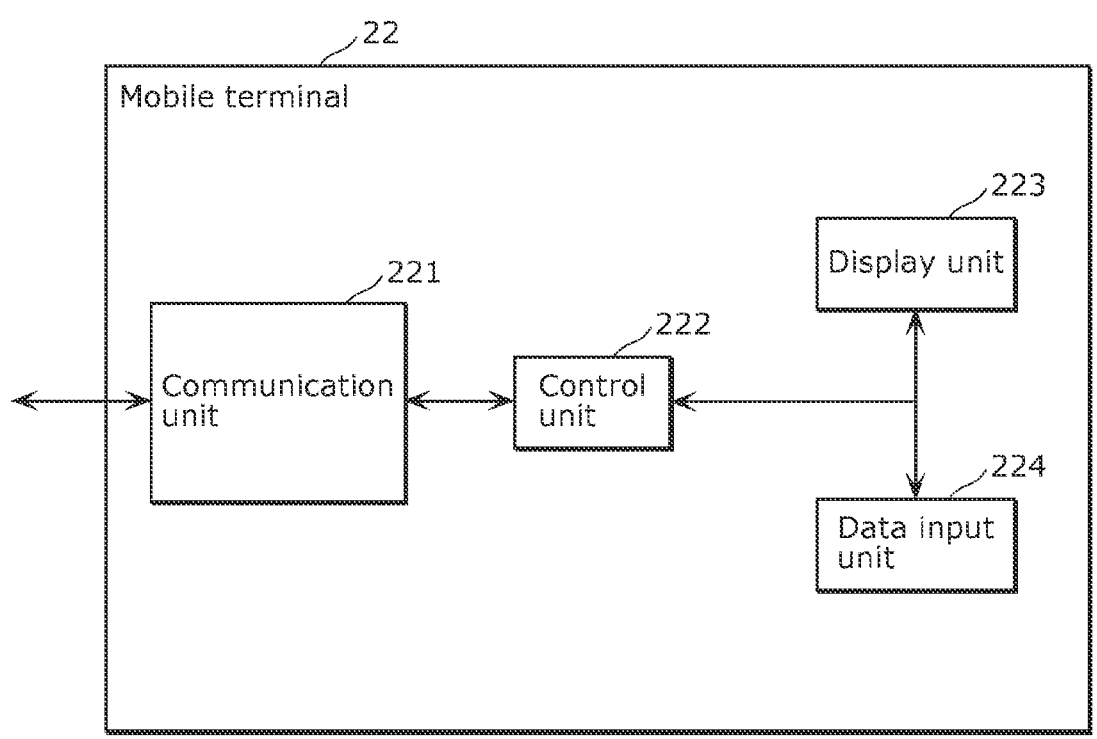
FIG. 29 is a configuration diagram of a mobile terminal according to Embodiment 5.

FIG. 29 is a functional block diagram of the mobile terminal 22 according to Embodiment 5. As illustrated in the diagram, the mobile terminal 22 includes: a communication unit 221; a control unit 222; a display unit 223; and a data input unit 224.

The communication unit 221 performs communication with the management apparatus 11. More specifically, the communication unit 221 receives the visualization data from the management apparatus 11. In addition, the communication unit 221 transmits a remote control instruction to the management apparatus 11.

The control unit 222 transmits, to the display unit 223, a display instruction together with the visualization data received from the management apparatus 11. In addition, the control unit 222 transmits the user ID and the password inputted using the data input unit 224, the share password, and the remote control instruction for the home appliance, to the management apparatus 11 via the communication unit 501.

The display unit 223 displays the visualization data generated by the management apparatus 11 according to the display instruction issued by the control unit 222. It is to be noted that the display unit 223, for example, is a display screen such as a touch panel, an LCD (liquid crystal display), or a CRT (cathode-ray tube).

The data input unit 224 allows a user to input the user ID or the password used for logging in to the management apparatus 11, the share password used for sharing the home appliance information, and the setting information for the home appliance remote control. It is to be noted that the data input unit 224 is an input operation unit such as a software keyboard, an input button, or the like.

21. Configuration of the Home Appliance 31

Figure 30:
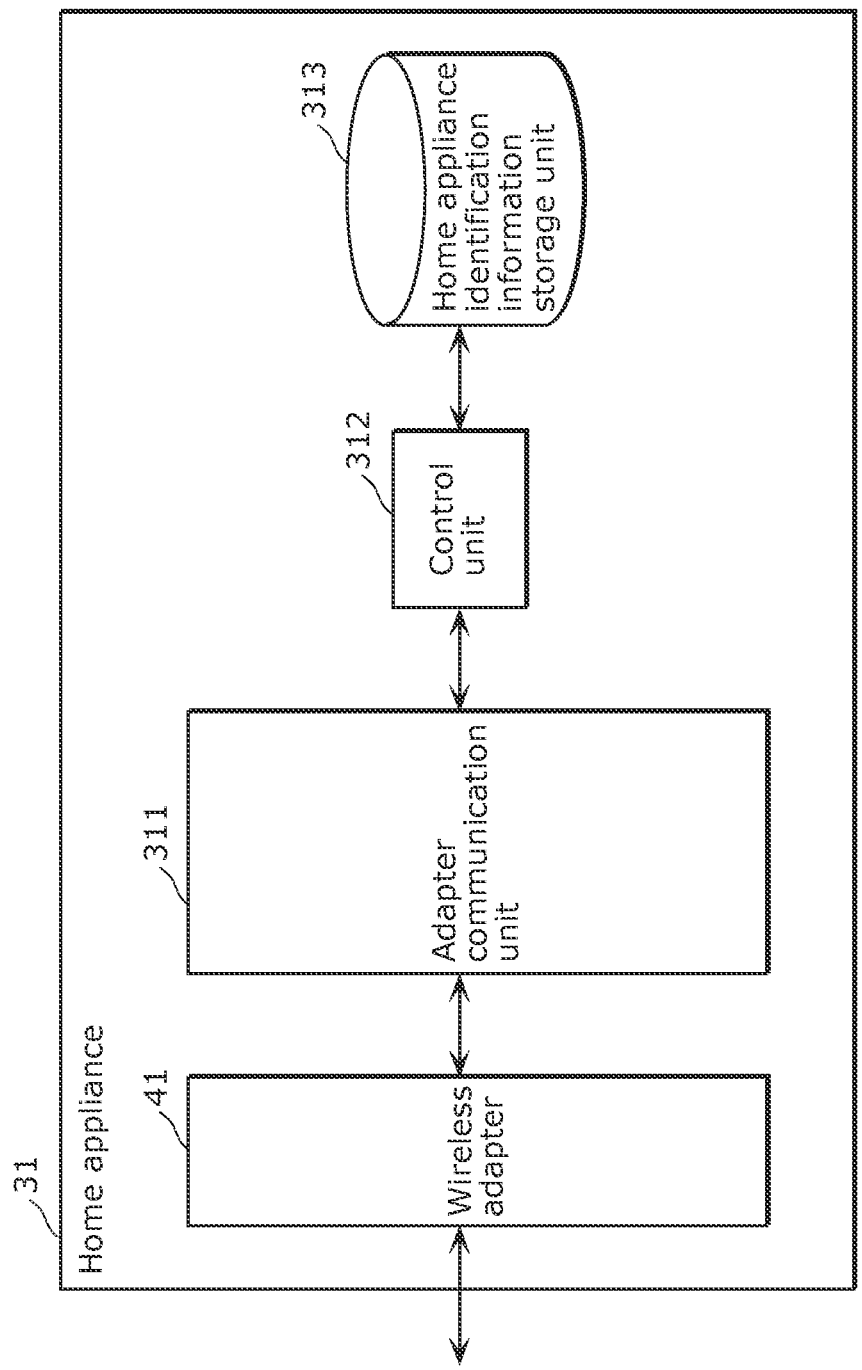
FIG. 30 is a configuration diagram of a home appliance according to Embodiment 5.

FIG. 30 is a functional block diagram of the home appliance 31 according to Embodiment 5. As illustrated in the diagram, the home appliance 31 includes: an adapter communication unit 311; a control unit 312; a home appliance identification information storage unit 313; and a wireless adapter 41.

The adapter communication unit 311 controls communication with the wireless adapter 41, and transmits home appliance information such as home appliance history information to the gateway terminal 50 via the wireless communication.

The control unit 312, when the home appliance 31 is operated, transmits the operation history of the home appliance 31 or the setting information set by the user, to the management apparatus 11 via the wireless adapter 41. In addition, the control unit 312 controls the home appliance 31 based on the control command received from the gateway terminal 50 via the wireless communication.

The home appliance identification information storage unit 313 is a memory for storing the home electrical appliance ID which is a unique ID for identifying the home appliance 31.

22. Operation of the Home Appliance Registering Processing

The operation of the home appliance registering processing will de described, which is performed for registering the home appliance on the management apparatus 11. In the home appliance registering processing according to this exemplary embodiment, the home appliance 31 or the share password managed by the gateway terminal 50 is not registered when the gateway terminal 50 has not been registered on the management apparatus 11. In this case, the management apparatus 11 performs the processes from the settings of the share password to the registration of the home appliance 31. On the other hand, when the gateway terminal 50 has been registered on the management apparatus 11, the home appliance 31 or the share password has already been registered. At this time, the management apparatus 11 permits registration of the home appliance 31 managed by the gateway terminal 50 only when the received share password matches the registered share password. The following describes in detail the flow of the processes.

Figure 31:
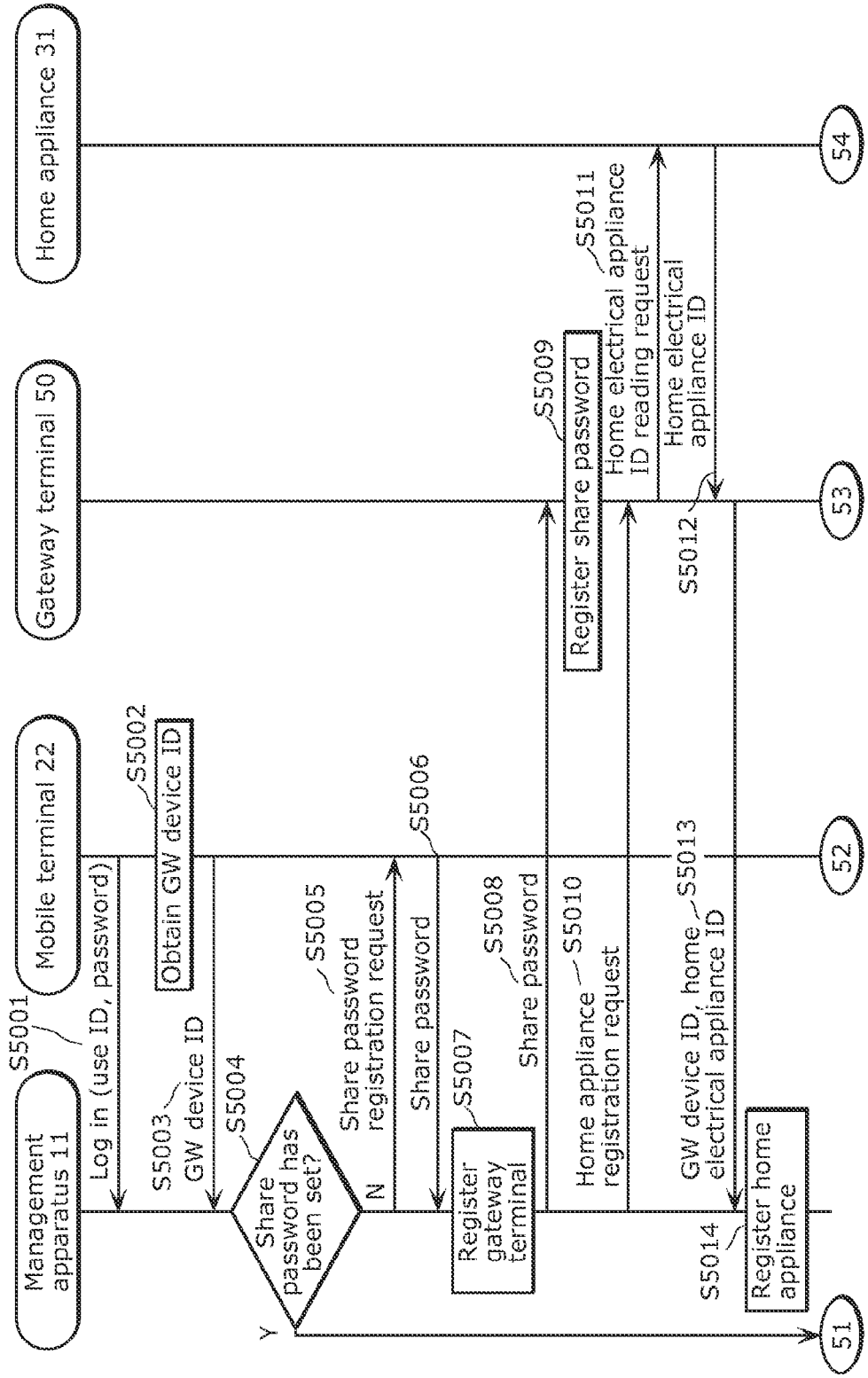
FIG. 31 is a sequence diagram which illustrates a flow of home appliance registering processing according to Embodiment 5.
Figure 32:
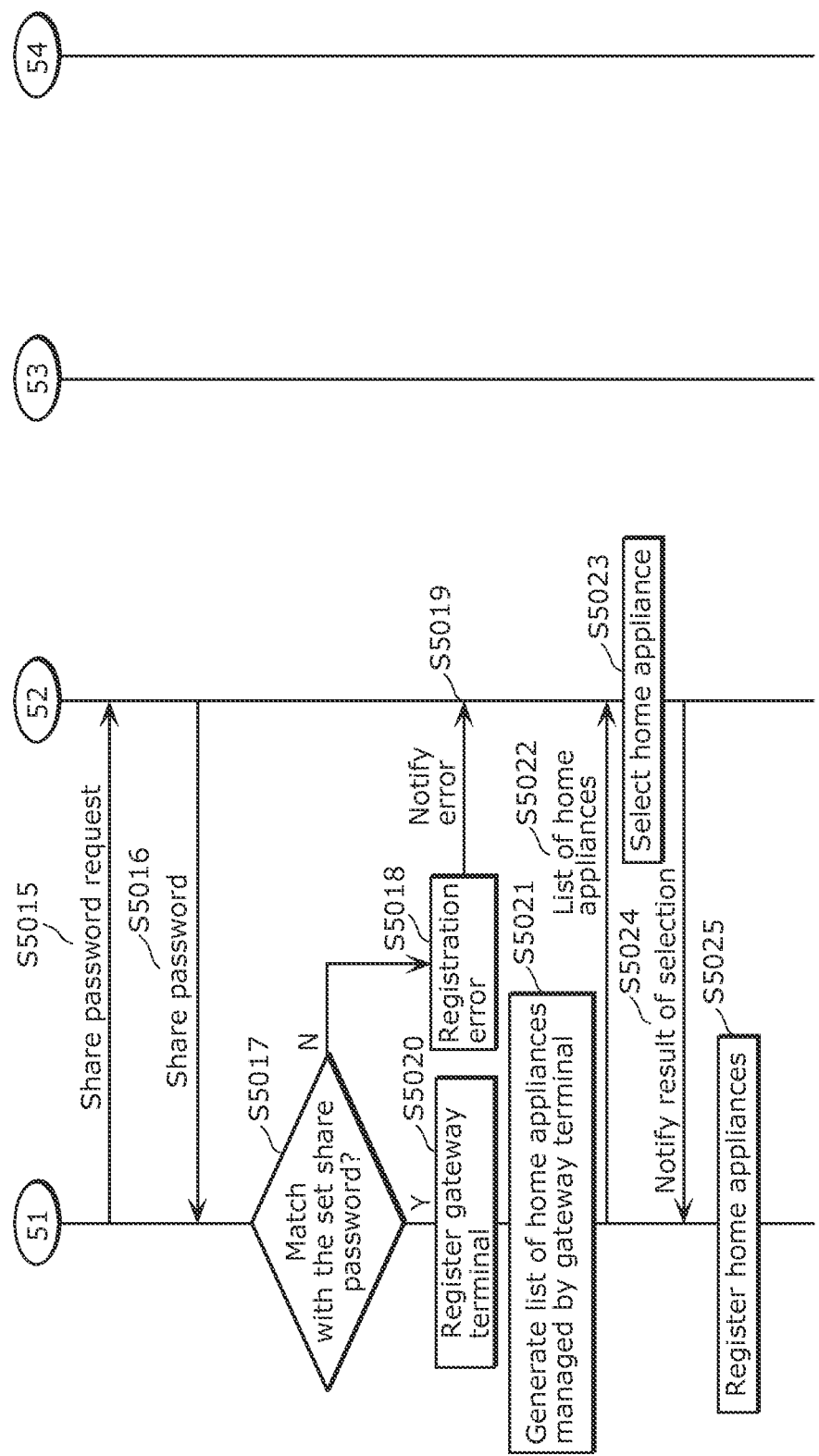
FIG. 32 is a sequence diagram which illustrates a flow of home appliance registering processing according to Embodiment 5.

FIG. 31 and FIG. 32 are sequence diagrams each illustrating a flow of the home appliance registering processing according to Embodiment 5.

A user who uses the mobile terminal 22 inputs a user ID and a password to the mobile terminal 22 via the data input unit 224 of the mobile terminal 22, in order to log in to the management apparatus 11. Then the control unit 222 of the mobile terminal 22 transmits the user ID and the password which are provided by the user, to the management apparatus 11 via the communication unit 221 (S5001).

Next, the control unit 222 of the mobile terminal 22 obtains the GW device ID for identifying the gateway terminal 50, in order to register the gateway terminal 50 on the management apparatus 11 (S5002). Here, when the GW terminal ID is described on the gateway terminal 50 itself, the mobile terminal 22 may directly read the GW terminal ID from the gateway terminal itself. In addition, when the gateway terminal 50 has the function of communicating with the mobile terminal 22, the mobile terminal 22 may obtain the GW terminal ID from the gateway terminal 50 through the communication.

Then, the control unit 222 of the mobile terminal 22 transmits the obtained GW device ID together with the gateway terminal registration request, to the management apparatus 11 (S5003).

Then, the control unit 112 of the management apparatus 11, upon receiving the gateway terminal registration request from the mobile terminal 22, determines whether or not the share password has been set to the gateway terminal of the received GW device ID (S5004).

The control unit 112 of the management apparatus 11, when it is determined that the share password has not been set (N in S5004), transmits a share password registration request to the mobile terminal 22 (S5005).

Next, the control unit 222 of the mobile terminal 22 urges the user to input the share password via the data input unit 224, and transmits the share password provided by the user to the management apparatus 11 (S5006).

Then, the home appliance information managing unit 113 of the management apparatus 11 registers the received share password in association with the GW device ID and the user ID of the logged-in user, on the home appliance information list 1055, thereby registering the gateway terminal 50 (S5007).

Next, the control unit 222 of the management apparatus 11 transmits the share password to the gateway terminal which is identified by the obtained GW device ID (S5008). In this exemplary embodiment, description will be given using the case where the gateway terminal 50 is identified by the GW device ID provided by the user.

The control unit 503 of the gateway terminal 50, upon receiving the share password from the management apparatus 11, registers the share password on the share password storage unit 505 (S5009).

Next, the control unit 222 of the management apparatus 11 transmits the home appliance registration request to the gateway terminal 50 (S5010).

The control unit 503 of the gateway terminal 50, upon receiving the home appliance registration request, searches for a home appliance located near the gateway terminal 50, and transmits the home electrical appliance ID reading request to the home appliance found as a result of the searching (S5011). In this exemplary embodiment, an example of registering the home appliance 31 is used in the description.

The home appliance 31, upon receiving the home electrical appliance ID reading request from the gateway terminal 50, transmits the home electrical appliance ID to the gateway terminal 50 (S5012). Then the gateway terminal 50, upon receiving the home electrical appliance ID from the home appliance 31, transmits the home electrical appliance ID together with the GW device ID to the management apparatus 11 (S5013).

Then, the home appliance information managing unit 113 of the management apparatus 11, upon receiving the GW device ID and the home electrical appliance ID, registers the home electrical appliance ID on the home appliance information list 1055, in association with the GW device ID which has been registered in Step S5007 (S5014).

In addition, the control unit 12 of the management apparatus 11, when it is determined that the share password has been set (Y in S5004), sends the mobile terminal 22 a request for the share password (S5015).

Then, the control unit 222 of the mobile terminal 22 urges the user to input the share password via the data input unit 224, and transmits the share password provided by the user to the management apparatus 11 (S5016).

Then, the control unit 112 of the management apparatus 11 determines whether or not the received share password matches the share password which has been set to the registered gateway terminal 50 (S5017).

The control unit 112 of the management apparatus 11, when it is determined that the received share password does not match the set share password (N in S5017), determines it as a registration error (S5018). Then, the control unit 112 of the management apparatus 11 transmits a notification of the registration error to the mobile terminal 22 (S5019).

On the other hand, when the control unit 112 of the management apparatus 11 determines that the received share password matches the share password which has been set (Y in S5017), the home appliance information managing unit 113 registers the gateway terminal on the home appliance information list 1055 in association with the user ID of the logged-in user and the GW device ID (S5020).

Then, the home appliance information managing unit 113 of the management apparatus 11 refers to the home appliance information list 1055 to generate a list of home appliances which are managed by the gateway terminal 50 from the home electrical appliance ID associated with the gateway terminal 50 (S5021). Then, the home appliance information managing unit 113 transmits the generated list of home appliances to the mobile terminal 22 via the communication unit 111 (S5022).

Next, the control unit 222 of the mobile terminal 22 receives the list of home appliances, and displays the list on the display unit 223 to urge the user to select a home appliance to be registered via the data input unit 224 (S5023). Then, the control unit 222 of the mobile terminal 22 notifies the management apparatus 11 of a selection result of a home appliance (S5024).

Then, the home appliance information managing unit 113 of the management apparatus 11 obtains the home electrical appliance ID from the received selection result, and registers the home electrical appliance ID on the home appliance information list 1055, in association with the GW device ID of the gateway terminal and the user ID (S5025).

23. Operation of Upload Processing of the Home Appliance History Information Next, the operation of home appliance history information upload processing will be described.

Figure 33:
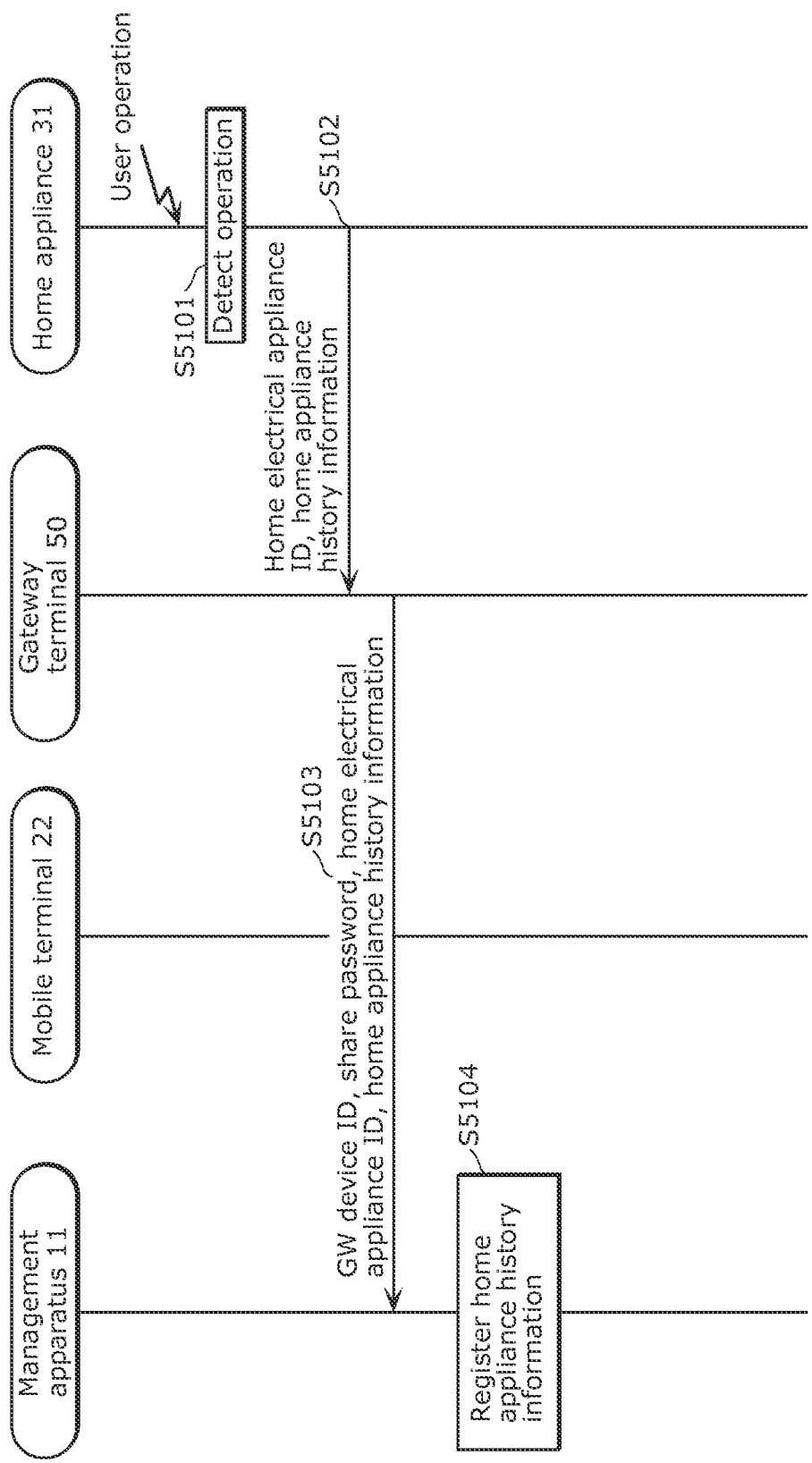
FIG. 33 is a sequence diagram which illustrates a flow of home appliance history information upload processing according to Embodiment 5.

FIG. 33 is a sequence diagram which illustrates a flow of the home appliance history information upload processing according to Embodiment 5.

When a user operates the home appliance 31, the home appliance 31 detects the user operation (S5101). Then, the home appliance 31, subsequent to the detection of the user operation, transmits information items such as operation history of the home appliance, a settings state, and a power consumption amount, as the home appliance history information, to the gateway terminal 50 together with the home electrical appliance ID (S5102).

The control unit 503 of the gateway terminal 50 transmits, to the management apparatus 11, the received home electrical appliance ID and the home appliance history information together with the GW device ID stored by the identification information storage unit 504 and the share password stored by the share password storage unit 505 (S5103).

Then, the home appliance information managing unit 113 of the management apparatus 11 stores the home appliance history information on the home appliance information list 1055 for a user associated with the received GW device ID, home electrical appliance ID, add share password (S5104).

24. Operation of Visualization Data Obtaining Processing

Next, the operation of visualization data obtaining processing will be described.

Figure 34:
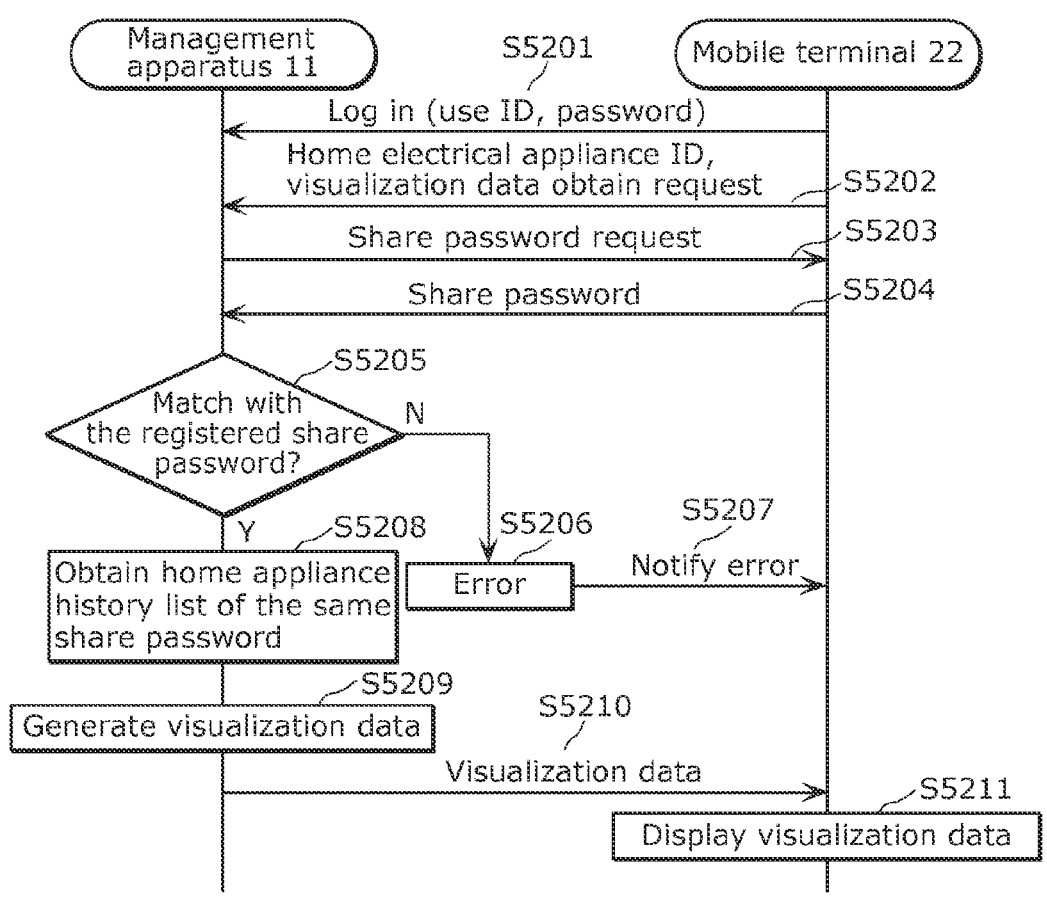
FIG. 34 is a sequence diagram which illustrates a flow of home appliance information obtaining processing according to Embodiment 5.

FIG. 34 is a sequence diagram which illustrates a flow of home appliance information obtaining processing according to Embodiment 5. More specifically, FIG. 34 is a sequence diagram which illustrates a flow of the visualization data obtaining processing.

A user who desires to obtain visualization data inputs a user ID and a password to the mobile terminal 22 via the data input unit 224 of the mobile terminal 22, in order to log in to the management apparatus 11. Then the control unit 222 of the mobile terminal 22 transmits the user ID and the password which are provided by the user, via the communication unit 221 (S5201).

Next, the control unit 222 of the mobile terminal 22 transmits a visualization data obtaining request together with the home electrical appliance ID of the home appliance of which the visualization data is desired to be obtained, to the management apparatus 11 via the communication unit 221 (S5202).

Then the control unit 112 of the management apparatus 11 receives the user ID (the user ID of a logged-in user), the home electrical appliance ID, and the visualization data obtaining request, via the communication unit 111, and sends the mobile terminal 22 a request for the share password (S5203).

Then, the mobile terminal 22 urges the user to input the share password, and transmits the provided share password to the management apparatus 11 (S5204). Then, the control unit 112 of the management apparatus 11 determines whether or not the received share password matches the registered share password (S5205).

The control unit 112 of the management apparatus 11, when it is determined that the received share password does not match the registered share password (N in S5205), determines it as an error (S5206). Then, the control unit 112 of the management apparatus 11 notifies the mobile terminal 22 of the error (S5207).

On the other hand, when the control unit 112 of the management apparatus 11 determines that the received share password matches the registered share password (V in S5205), transmits the user ID, the home electrical appliance ID, and the instruction for generating visualization data, to the visualization data generating unit 104. Then, the visualization data generating unit 114 refers to the home appliance information list 1055, and obtains all items of the home appliance history information which have the same home electrical appliance ID and the share password (S5208).

Then, the visualization data generating unit 114 generates visualization data from the obtained home appliance history information (S5209). More specifically, the visualization data generating unit 114 generates data which indicates, for example, operation history of the home appliance, eco-information, cumulative electricity expenses, and so on, using the home appliance history information of the user corresponding to the same share code as the share code of the logged-in user.

Then, the control unit 112 transmits the visualization data generated by the visualization data generating unit 114, to the mobile terminal 22 via the communication unit 111.

Then the control unit 222 of the mobile terminal 22 displays the received visualization data on the display unit 223 (S5211).

25. Operation of Remote Control Processing

Next, the operation of remote control processing will be described. In this exemplary embodiment, a request for a remote operation is sent from the mobile terminal 22 to the management apparatus 11. Then, the management apparatus 11 generates a remote control command, the home appliance 31 is operated via the gateway terminal 50.

Figure 35:
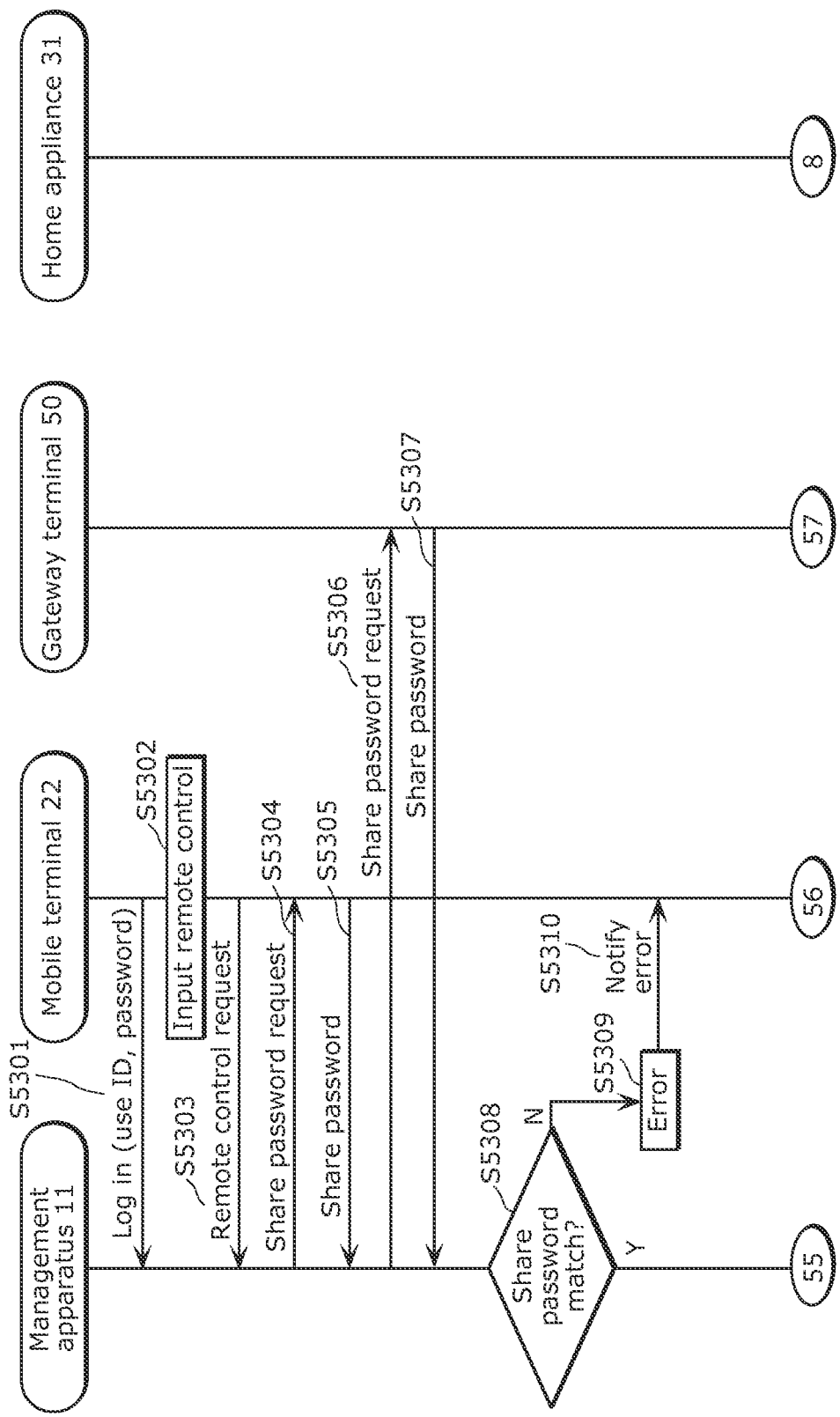
FIG. 35 is a sequence diagram which illustrates a flow of remote control processing according to Embodiment 5.
Figure 36:
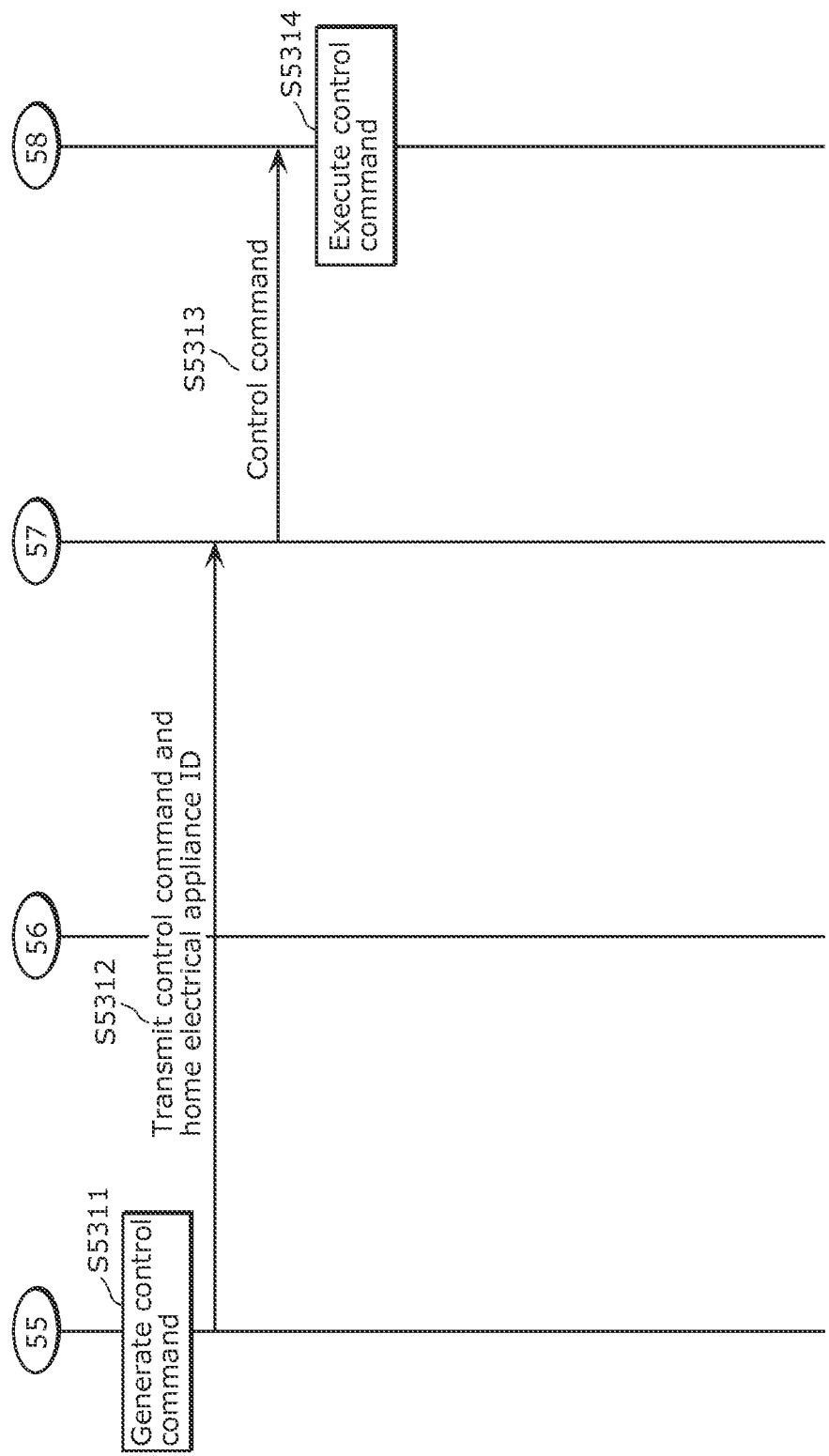
FIG. 36 is a sequence diagram which illustrates a flow of the remote control processing according to Embodiment 5.

FIG. 35 and FIG. 36 are sequence diagrams each illustrating a flow of the remote control processing according to Embodiment 5.

A user who executes remote control operation inputs a user ID and a password to the mobile terminal 22 via the data input unit 224, in order to log in to the management apparatus 11. Then the control unit 222 of the mobile terminal 22 transmits the user ID and the password which are provided by the user, to the management apparatus 11 via the communication unit 221 (S5301).

Next, the data input unit 224 of the mobile terminal 22 receives an input of control request of remote control (S5302). The remote control is a control such as turning on/off of an operation of a home appliance, turning on/off of an operation by a timer, and so on. The control unit 222 of the mobile terminal 22 transmits the control request of remote control provided by the user via the data input unit 224, to the management apparatus 11 (S5303).

Then, the control unit 112 of the management apparatus 11, upon receiving the control request, sends a request for a share password to the mobile terminal 22 (S5304). The control unit 222 of the mobile terminal 22 urges the user to input the share password, and transmits the provided share password to the management apparatus 11 (S5305).

Next, the control unit 112 of the management apparatus 11 sends a request for a share password to the mobile terminal 50 (S5306). Then, the control unit 503 of the gateway terminal 50 transmits, to the management apparatus 11, the share password stored by the share password storage unit 505 (S5307).

Then, the control unit 112 of the management apparatus 11 determines whether or not the share password received from the mobile terminal 22 matches the share password received from the gateway terminal 50 (S5308).

The control unit 112 of the management apparatus 11, when it is determined that the share passwords are mismatched (N in S5308), determines it as an error (S5309). Then, the control unit 112, when it is determined as an error, notifies the mobile terminal 22 of the error (S5310).

On the other hand, the control unit 112 of the management apparatus 11, when it is determined that the share passwords are matched (Y in S5308), generates a control command based on the control request from the user (S5311).

Next, the control unit 112 of the management apparatus 11 transmits the home electrical appliance ID of the home appliance which is a subject of control and the control command to the gateway terminal 50 (S5312). Then, the control unit 503 of the gateway terminal 50, upon receiving the home electrical appliance ID and the control command from the management apparatus 11, transmits the control command to the home appliance 31 corresponding to the received home electrical appliance ID (S5313). Then, the control unit 312 of the home appliance 31, upon receiving the control command, executes processing based on the control command (S5314).

As described above, the communication unit 111 is connected, via the network 15, to the gateway terminal 50 which receives home appliance information from the home electrical appliance, and receives home appliance information from the gateway terminal 50.

In addition, the home appliance information managing unit 113 causes the home appliance information holding unit 115 to store the share information (share password) which is generated by a user who is registered in association with the gateway 50 when the gateway terminal 50 is registered, in association also with the gateway identification information (GW device ID) which identifies the gateway terminal 50.

Then, the home appliance information managing unit 113, upon receiving the share information and the home appliance information from the gateway terminal 50, causes the home appliance holding unit 115 to store the received home appliance information as home appliance information of the user associated with the share information that is the same as the received share information.

In addition, the control unit 112, when the control command of the home electrical appliance is received from the user, transmits a control command for controlling the home electrical appliance to the gateway terminal 50 only when the share information associated with the user matches the share information received from the gateway terminal 50.

26. Advantageous Effect

With the above-described exemplary embodiment, it is possible to prevent a home appliance from being fraudulently registered and prevent home appliance history information from being fraudulently obtained, by registering a share password when home appliance information is automatically collected from the home appliance. In addition, only the user who knows the share password registered on the gateway terminal can register a home appliance and obtain visualization data. In addition, with the remote control, only the user who knows the share password stored in the gateway terminal can transmit a control command, and thus it is possible to prevent a fraudulent operation.

(Modification of Embodiment 5)

In the above-described Embodiment 5, it has been described that the management apparatus 11 receives the share information (share password) from the gateway terminal 50, and registration of a home appliance, obtainment of visualization data, transmission of a control command, and so on can be carried out only when the share information associated with a user matches the share information received from the gateway terminal 50. However, according to this modification example, by storing a latest share information (share password), it is possible to properly carry out registration of a home appliance, obtainment of visualization data, transmission of a control command, and so on without receiving the share information from the gateway terminal 50.

More specifically, the home appliance information managing unit 113 causes the home appliance information holding unit 115 to store the latest share information (share password) which is generated by a user who is associated with the gateway 50, in association also with the gateway identification information (GW device ID) which identifies the gateway terminal 50. Here, the home appliance information managing unit 113 causes the home appliance information holding unit 115 to store information indicating latest share information, by providing the latest share information with a flag, for example, so that it is possible to determine which share information is the latest information.

FIG. 37 is a diagram which illustrates an example of the home appliance information list 1056 according to Modification of Embodiment 5. As illustrated in the diagram, unlike the home appliance information list 1055 according to Embodiment 5 described above, the home appliance information list 1056 includes, to the right of a share password in the field of "share password", a sign "O" which is information indicating that the share password is the latest one. The management apparatus 11 determines whether or not the sign "O" is provided to the field of the "share password" in the home appliance information list 1056, thereby determining whether or not the target share information is the latest share information.

In other words, the management apparatus 11 is capable of properly performing registration of a home appliance, obtainment of visualization data, transmission of a control command, and so on without receiving the share information from the gateway terminal 50, by referring to the information indicating the latest share information of the home appliance information list 1056.

To be specific, the home appliance information managing unit 113 determines whether or not the received share password matches the latest share password in place of Step S5017 in FIG. 32 of Embodiment 5. Then, the home appliance information managing unit 113, when it is determined that the received share password matches the latest share password, registers the gateway terminal (S5020 in FIG. 32), registers the home electrical appliance ID (S5025 in FIG. 32), or stores the home appliance history information (S5104 in FIG. 33), on the home appliance information list 1056.

For example, the home appliance information managing unit 113, when receiving home appliance information from the gateway terminal 50 via the communication unit 111, refers to the information indicating the latest share information in the home appliance information list 1056, and causes the home appliance information holding unit 115 to store the received home appliance information as home appliance information of a user associated with the gateway identification information and the latest share information.

In addition, the visualization data generating unit 114 determines whether or not the received share password matches the latest share password in place of Step S5205 in FIG. 34 of Embodiment 5. Then, the visualization data generating unit 114, when it is determined that the received share password matches the latest share password, obtains all items of the home appliance history information corresponding to the same share password (S5208 in FIG. 34), or generates visualization data from the obtained home appliance history information (S5209 in FIG. 34).

In addition, the control unit 112 determines whether or not the received share password matches the latest share password in place of Step S5308 in FIG. 35 of Embodiment 5. Then, the control unit 112, when it is determined that the received share password matches the latest share password, generates a control command or transmits the generated control command (S5311 to S5313 in FIG. 36). More specifically, the control unit 112, when the control command of the home electrical appliance is received from the user, transmits the control command for controlling the home electrical appliance to the gateway terminal 50 only when the share information associated with the user is the latest share information.

It is to be noted that, in each of the above-described processes, the process of receiving the share information from the gateway terminal 50 performed by the management apparatus 11 in Embodiment 5 is not necessary in this Modification, and thus this process can be omitted.

According to the above-described Modification, by managing the latest share password when automatically collecting home appliance information from a home appliance, it is possible to prevent the home appliance from being fraudulently registered and to prevent the home appliance history information from fraudulently being obtained, without receiving share information from the gateway terminal. In addition, only the user who knows the latest share password can register a home appliance and obtain visualization data. Furthermore, with the remote control, only the user who knows the latest share password can transmit a control command, and thus it is possible to prevent a fraudulent operation.

(Other Modifications)

It is to be noted that although the present invention has been described based on the above-described exemplary embodiments, it should be understood that the present invention is not limited to the above-described exemplary embodiments. The cases described below are also included in the present invention.

(1) Although the home appliance information list is a list of a single home appliance according to the above-described exemplary embodiments, it is not limited to this, and the home appliance information list may be a list including a plurality of home appliances.

(2) Although a user ID and a password are provided from the mobile terminal and transmitted in order to log in to the management apparatus according to the above-described exemplary embodiments, it is not limited to this, and the state of login may be held and transmission of the user ID and the password may be omitted in subsequent logins.

(3) Although a home appliance includes a home appliance identification information storage unit according to the above-described exemplary embodiments, it is not limited to this, and an RFID tag or a wireless adapter mounted on the home appliance may include the home appliance identification information storage unit.

(4) Although a user with whom home appliance information is to be shared is registered at the time of registering a home appliance according to Embodiment 2 and Embodiment 3 described above, it is not limited to this, and the user with whom home appliance information is to be shared may be registered at any time. At this time, it is sufficient to execute Step S2009 and subsequent processes in Embodiment 2, and to execute S3009 and subsequent processes in Embodiment 3.

(5) Although a home appliance is registered by reading a device ID of the home appliance and transmitting the device ID when it is determined that home appliance history information is to be shared in Step S3013 according to Embodiment 3 described above, it is not limited to this, and a notification for sharing home appliance history information may be transmitted from the mobile terminal 21, and a home appliance which is identical to the home appliance registered by the mobile terminal 20 may be registered in the management apparatus 10.

(6) Although the management apparatus 11 sends a request for a share password after the mobile terminal 22 logged in, and the mobile terminal 22 transmits the share password, in Step S5015, Step S5203, and Step S5304 according to Embodiment 5 described above, it is not limited to this, and a request for a share password may not be sent when the management apparatus 11 stores the share password in association with a user.

(7) Although a share password is stored in the gateway terminal 50 according to Embodiment 5 described above, it is not limited to this, and the management apparatus 11 may manage the latest share password that is set to the gateway terminal 50, in this case, the home appliance history information upload processing, the visualization data obtaining processing, and the remote control processing are executed in association with the user who has the latest share password registered.

(8) Each of the above-described modules may specifically be an individual computer program, a module integrated in an operating system, a driver called by the operating system, or an application program (9) Each of the above-described apparatuses is specifically a computer system including a microprocessor, a ROM, a RAM, a hard disk unit, a display unit, a keyboard, a mouse, and the like. A computer program is stored in the RAM or the hard disk unit. Each of the apparatuses achieves its function through the microprocessor's operation according to the computer program. Here, the computer program is configured by combining a plurality of instruction codes each indicating an instruction for the computer so that a predetermined function is achieved.

(10) A part or all of the constituent elements constituting the respective apparatuses may be configured from a single System-LSI (Large-Scale integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as separate individual chips, or as a single chip to include a part or all thereof.

In addition, the name used here is system LSI, but it may also be called IC, LSI, super LSI, or ultra LSI depending on the degree of integration. Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of circuit cells inside an LSI can be used for the same purpose.

Furthermore, in the future, with advancement in semiconductor technology, a brand-new technology may replace LSI. The functional blocks can be integrated using such a technology. The possibility is that the present invention is applied to biotechnology.

(11) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

(12) The present invention may also be realized as a method described above (home appliance information sharing method). In addition, the present invention may be a computer program for realizing the previously illustrated methods using a computer, and may also be a digital signal including the computer program. In other words, the home appliance information sharing method is a home appliance information sharing method for collecting, from a home electrical appliance, home appliance information which is information related to the home electrical appliance, and providing a user with to-be-provided information which is information obtained from the collected home appliance information, the home appliance information sharing method comprising, when a request for providing the to-be-provided information is issued by the user: referring to data held by a home appliance information holding unit which holds, in association with each other, (i) the home appliance information and (ii) share information which is for sharing the home appliance information and is associated with the user; obtaining home appliance information held in association with share information identical to the share information associated with the user; and providing the user with the to-be-provided information obtained from the obtained home appliance information.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc (registered trademark)), and a semiconductor memory. Furthermore, the present invention may also include the digital signal recorded in these recording media In addition, the present invention may also be realized by the transmission of the aforementioned computer program or digital signal via a telecommunication line, a wireless or wired communication line, a network represented by the Internet, a data broadcast and so on The present invention may also be a computer system including a microprocessor and a memory, in which the memory stores the aforementioned computer program and the microprocessor operates according to the computer program.

In addition, by transferring the program or the digital signal by recording onto the aforementioned recording media, or by transferring the program or digital signal via the aforementioned network and the like, execution using another independent computer system is also made possible.

(13) In addition, each of the above-mentioned embodiments and modifications may be combined with each other.

INDUSTRIAL APPLICABILITY

The present invention can be widely applied to a system in which history information items of a home appliance are collected to a management apparatus, and the collected history information items of the home appliance are shared between users.

REFERENCE SIGNS LIST

1, 2 home appliance information sharing system
10, 11 management apparatus 15 network
16 RFID communication
17 wireless communication
20, 21, 22 mobile terminal
30, 31 home appliance
40 RFID tag
41 wireless adapter
50 gateway terminal
101, 111 communication unit
102, 112 control unit
103, 113 home appliance information managing unit
104, 114 visualization data generating unit
105, 115 home appliance information holding unit
1051, 1051A, 1051B, 1052, 1052A, 1052B, 1053, 1053A, 1055, 1056 home appliance information list
201, 221 communication unit
202 RFID communication unit
203, 222 control unit
204, 223 display unit
205, 224 data input unit
301 tag communication unit
302, 312 control unit
303, 313 home appliance identification information storage unit
304 home appliance history information holding unit
311 adapter communication unit
501 communication unit
502 wireless communication unit
503 control unit
504 identification information storage unit
505 share password storage unit

The invention claimed is:

1. A home appliance information management apparatus which collects, from a home electrical appliance, home appliance information which is information related to the home electrical appliance, and provides users of the home electrical appliance with to-be-provided information which is information obtained from the collected home appliance information, the home appliance information management apparatus comprising:
  a processor; and
  a first non-transitory computer-readable recording medium having stored thereon executable instructions, which when executed by the processor, cause the home appliance information management apparatus to:
  manage the home appliance information;
  receive user identification information of each user of the users of the home electrical appliance;
  receive identification information of the home electrical appliance;
  receive information set by each user of the home electrical appliance, the information set by each user including first information set by a first user of the users, and other information set by at least one other user of the users different from the first user;
  hold, in a second non-transitory computer-readable recording medium, the user identification information of each user, the identification information of the home electrical appliance, the information set by each user, and the home appliance information, thereby registering the home electrical appliance with the home appliance information management apparatus, the information set by each user being information for allowing sharing of the collected home appliance information between the users of the home electrical appliance, and the home appliance information including operation history collected from the home electrical appliance, for each user of the users who operates the home electrical appliance; and
  when a request for providing the to-be-provided information is issued by the first user:
    refer to a home appliance information list stored in the second non-transitory computer-readable recording medium, the home appliance information list holding, in association with each other, the user identification information of each user, the identification information of the home electrical appliance, the information set by each user, and the home appliance information;
    compare the first information set by the first user with the other information set by the at least one other user;
    determine if the first information set by the first user is identical to the other information set by the at least one other user;
    when the first information set by the first user is determined to be identical to the other information set by the at least one other user, obtain, as the to-be-provided information, collected home appliance information of the first user and collected home appliance information of the at least one other user; and
    when the first information set by the first user is determined to not be identical to the other information set by the at least one other user, obtain, as the to-be-provided information, the collected home appliance information of the first user.

2. The home appliance information management apparatus according to claim 1, wherein the executable instructions, when executed by the processor, cause the home appliance information management apparatus to further:
  connect, via a communication network, to a gateway terminal which receives the home appliance information from the home electrical appliance, and receive the home appliance information from the gateway terminal;
  store, in the second non-transitory computer-readable recording medium, latest information set by each user in association with gateway identification information for identifying the gateway terminal, the latest information set by each user including latest first information set by the first user, the first user being associated with the gateway terminal; and
  when receiving the home appliance information from the gateway terminal, store, in the second non-transitory computer-readable recording medium, the received home appliance information as home appliance information of the first user associated with the gateway identification information and the latest first information set by the first user.

3. The home appliance information management apparatus according to claim 2,
  wherein the executable instructions, when executed by the processor, cause the home appliance information management apparatus to further:
  transmit, when receiving a control command for the home electrical appliance from the user, the control command for controlling the home electrical appliance to the gateway terminal when the first information set by the first user is the latest first information set by the first user.

4. The home appliance information management apparatus according to claim 1, wherein the executable instructions, when executed by the processor, cause the home appliance information management apparatus to further:

connect, via a communication network, to a gateway terminal which receives the home appliance information from the home electrical appliance, and is configured to receive the home appliance information from the gateway terminal;

store, in the second non-transitory computer-readable recording medium, when registering the gateway terminal with the home appliance information management apparatus, the first information set by the first user in association with gateway identification information for identifying the gateway terminal, the first information set by the first user registered in association with the gateway terminal; and when receiving the other information set by the at least one other user and the home appliance information from the gateway terminal, store, in the second non-transitory computer-readable recording medium, the received home appliance information as home appliance information of the at least one other user associated with the other information set by the at least one other user, when the received other information set by the at least one other user is identical to the first information set by the first user.

5. The home appliance information management apparatus according to claim 4, wherein the executable instructions, when executed by the processor, cause the home appliance information management apparatus to further:

transmit, when receiving a control command for the home electrical appliance from the user, the control command for controlling the home electrical appliance to the gateway terminal only when the first information set by the first user matches the other information set by the at least one other user received from the gateway terminal.

6. The home appliance information management apparatus according to claim 1, wherein the executable instructions, when executed by the processor, cause the home appliance information management apparatus to further:

store, in the second non-transitory computer-readable recording medium, when storing, in the second non-transitory computer-readable recording medium, identification information of the home electrical appliance, the first information set by the first user.

7. The home appliance information management apparatus according to claim 1, wherein the executable instructions, when executed by the processor, cause the home appliance information management apparatus to further:

hold, in the second non-transitory computer-readable recording medium, as the information set by each user, identification information of a group of the users who are to be provided with the to-be-provided information, in association with the home appliance information; and when the request for providing the to-be-provided information is issued by the first user, refer to the home appliance information list stored in the second non-transitory computer-readable recording medium and provide the first user with the to-be-provided information.

8. The home appliance information management apparatus according to claim 7, wherein the executable instructions, when executed by the processor, cause the home appliance information management apparatus to further:

store, in the second non-transitory computer-readable recording medium, the information set by each user when storing, in the second non-transitory computer-readable recording medium, the identification information of the home electrical appliance in association with the first user;

receive second user identification information of the user identification information for identifying a second user of the users when the first user selects the second user as a user who is to be provided with second information identical to the first information set by the first user; and store, in the second non-transitory computer-readable recording medium, in association with the second user, the first information set by the first user.

9. The home appliance information management apparatus according to claim 1, wherein the executable instructions, when executed by the processor, cause the home appliance information management apparatus to further:

store, in the second non-transitory computer-readable recording medium, first identification information of the user identification information for the first user associated with the identification information of the home electrical appliance when storing, in the second non-transitory computer-readable recording medium, the identification information of the home electrical appliance; and receive second user identification information of the user identification information for identifying a second user of the users and store, in the second non-transitory computer-readable recording medium, the second user identification information for identifying the second user, in association with the identification information of the home electrical appliance, when the first user selects the second user as a user who is to be permitted to store, in the second non-transitory computer-readable recording medium, the identification information of the home appliance.

10. The home appliance information management apparatus according to claim 1, wherein the executable instructions, when executed by the processor, cause the home appliance information management apparatus to further:

store, in the second non-transitory computer-readable recording medium, first user identification information of the user identification information for the first user associated with identification information of the home electrical appliance when storing, in the second non-transitory computer-readable recording medium, the identification information of the home electrical appliance;

transmit second user identification information of the user identification information for identifying a second user of the users, for asking the first user whether or not registration is permitted when storing, in the second non-transitory computer-readable recording medium, the identification information of the home electrical appliance in association with the second user; and store, in the second non-transitory computer-readable recording medium, the second user identification information of the second user in association with the identification information of the home electrical appliance only when receiving permission for registration from the first user.

11. A home appliance information sharing system comprising:
  a mobile terminal; and
  the home appliance information management apparatus according to claim 1, which collects, from the home electrical appliance, the home appliance information which is information related to the home electrical appliance, and provides the first user with the to-be-provided information which is information obtained from the collected home appliance information.

12. A home appliance information sharing method for collecting, from a home electrical appliance, home appliance information which is information related to the home electrical appliance, and providing users of the home electrical appliance with to-be-provided information which is information obtained from the collected home appliance information, the home appliance information sharing method comprising:
  receiving user identification information of each user of the users of the home electrical appliance;
  receiving identification information of the home electrical appliance;
  receiving information set by each user of the home electrical appliance, the information set by each user including first information set by a first user of the users, and other information set by at least one other user of the users different from the first user;
  holding, in a second non-transitory computer-readable recording medium, the user identification information of each user, the identification information of the home electrical appliance, the information set by each user, and the home appliance information, thereby registering the home electrical appliance with the home appliance information management apparatus, the information set by each user being information for allowing sharing of the collected home appliance information between the users of the home electrical appliance, and the home appliance information including operation history collected from the home electrical appliance, for each user who operates the home electrical appliance; and
  when a request for providing the to-be-provided information is issued by the user:
    referring to a home appliance information list stored in the second non-transitory computer-readable recording medium, the home appliance information list holding, in association with each other, the identification information of each user, the identification information of the home electrical appliance, the information set by each user, and the home appliance information;
    comparing the first information set by the first user with the other information set by the at least one other user;
    determining if the first information set by the first user is identical to the other information set by the at least one other user;
    when the first information set by the first user is determined in the determining to be identical to the other information set by the at least one other user, obtaining, as the to-be-provided information, collected home appliance information of the first user and collected home appliance information of the at least one other user; and
    when the first information set by the first user is determined in the determining to not be identical to the other information set by the at least one other user, obtaining, as the to-be-provided information, the collected home appliance information of the first user.

13. A first non-transitory computer-readable recording medium for use in a computer, the first non-transitory computer-readable recording medium having a computer program recorded thereon for causing the computer to execute: the home appliance information sharing method according to claim 12.

14. An integrated circuit for collecting, from a home electrical appliance, home appliance information which is information related to the home electrical appliance, and providing users with to-be-provided information which is information obtained from the collected home appliance information, the integrated circuit comprising:
  a managing circuit configured to manage the home appliance information,
  wherein the managing circuit is configured to:
  receive user identification information of each user of the users of the home electrical appliance;
  receive identification information of the home electrical appliance;
  receive information set by each user of the home electrical appliance, the information set by each user including first information set by a first user of the users, and other information set by at least one other user of the users different from the first user;
  hold, in a home appliance information holding circuit, the user identification information of each user, the identification information of the home electrical appliance, the information set by each user, and the home appliance information, thereby registering the home electrical appliance with the home appliance information management apparatus, the information set by each user being information for allowing sharing of the collected home appliance information between the users of the home electrical appliance, and the home appliance information including operation history collected from the home electrical appliance, for each user of the users who operates the home electrical appliance; and
  when a request for providing the to-be-provided information is issued by the user, the managing circuit is configured to:
    refer to a home appliance information listed stored in the home appliance information holding circuit which holds, in association with each other, the user identification information of each user, the identification information of the home electrical appliance, the information set by each user, and the home appliance information;
    compare the first information set by the first user with the other information set by the at least one other user;
    determine if the first information set by the first user is identical to the other information set by the at least one other user;
    when the first information set by the first user is determined to be identical to the other information set by the at least one other user, obtain, as the to-be-provided information, collected home appliance information of the first user and collected home appliance information of the at least one other user; and
    when the first information set by the first user is determined to not be identical to the other information set by the at least one other user, obtain, as the to-be-provided information, the collected home appliance information of the first user.

15. The home appliance information management apparatus according to claim 1,
wherein the first information set by the first user is a share code or a share password.

16. The home appliance information management apparatus according to claim 1,
wherein the executable instructions, when executed by the processor, cause the home appliance information apparatus to further:
control the home electrical appliance based on remote control by a mobile terminal of the user.

17. The home appliance information management apparatus according to claim 4,
wherein the gateway terminal manages the home electrical appliance, and the executable instructions, when executed by the processor, cause the home appliance information management apparatus to further:
permit registration of the home electrical appliance managed by the gateway terminal only when the received other information set by the at least one other user matches the first information set by the first user.

18. The home appliance information management apparatus according to claim 2,
wherein the executable instructions, when executed by the processor, cause the home appliance information management apparatus to further:
provide the latest information set by each user with a flag; and
determine which information set by each user is the latest information set by each user based on the flag.

* * * * *